(12) United States Patent
Nakano et al.

(10) Patent No.: US 12,562,838 B2
(45) Date of Patent: *Feb. 24, 2026

(54) BASE STATION, TERMINAL AND COMMUNICATION METHOD

(71) Applicant: Panasonic Intellectual Property Corporation of America, Torrance, CA (US)

(72) Inventors: Takayuki Nakano, Ishikawa (JP); Yoshio Urabe, Nara (JP); Takashi Iwai, Ishikawa (JP); Tomofumi Takata, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,997

(22) Filed: Jul. 15, 2024

(65) Prior Publication Data

US 2024/0372646 A1 Nov. 7, 2024

Related U.S. Application Data

(63) Continuation of application No. 17/601,903, filed as application No. PCT/JP2020/002162 on Jan. 22, 2020, now Pat. No. 12,074,699.

(30) Foreign Application Priority Data

Apr. 23, 2019 (JP) ................................. 2019-081799

(51) Int. Cl.
  *H04L 1/00* (2006.01)
  *H04L 1/1812* (2023.01)
  (Continued)

(52) U.S. Cl.
  CPC .......... *H04L 1/0026* (2013.01); *H04L 1/1819* (2013.01); *H04L 1/1825* (2013.01); *H04W 28/04* (2013.01)

(58) Field of Classification Search
  CPC ... H04L 1/0026; H04L 1/1819; H04L 1/1825; H04L 1/0003; H04L 1/0009;
  (Continued)

(56) References Cited

U.S. PATENT DOCUMENTS 8,743,780 B2 6/2014 Sangiamwong et al.
2008/0056202 A1 3/2008 Kim et al.
(Continued)

FOREIGN PATENT DOCUMENTS

CN 1780169 A 5/2006
CN 1798010 A 7/2006
(Continued)

OTHER PUBLICATIONS

Extended European Search Report, dated May 9, 2022 for European Application No. 20796315.8-1206, 8 pages.
(Continued)

*Primary Examiner* — James C Kerveros
(74) *Attorney, Agent, or Firm* — Seed Intellectual Property Law Group LLP

(57) ABSTRACT

A base station is provided with: a control circuit that, on the basis of one of a communication parameter which is set in accordance with communication quality and a retransmission control operation, decides the other thereof, and a communication circuit that, on the basis of the communication parameter or retransmission control operation to be decided, communicates with a terminal.

5 Claims, 22 Drawing Sheets

(51) Int. Cl.
  *H04L 1/1825*   (2023.01)
  *H04W 28/04*   (2009.01)

(58) Field of Classification Search
  CPC ... H04L 1/0025; H04L 1/1822; H04L 1/1861;
    H04L 1/1896; H04L 1/20; H04W 28/04;
    H04W 84/12
  USPC ........................................................ 714/726
  See application file for complete search history.

(56) References Cited

U.S. PATENT DOCUMENTS

| | | | |
|---|---|---|---|
| 2009/0300453 A1 | 12/2009 | Sahara | |
| 2010/0309870 A1 | 12/2010 | Wengerter et al. | |
| 2010/0311431 A1* | 12/2010 | Papasakellariou ..... | H04B 1/713 |
| | | | 455/450 |
| 2011/0044196 A1 | 2/2011 | Ishii | |
| 2011/0145672 A1 | 6/2011 | Jongren et al. | |
| 2011/0173519 A1 | 7/2011 | Kuri et al. | |
| 2011/0194518 A1 | 8/2011 | Wu | |
| 2012/0051329 A1* | 3/2012 | Hirano .................. | H04L 1/0026 |
| | | | 370/332 |
| 2013/0242889 A1* | 9/2013 | Khoryaev ............. | H04L 1/1896 |
| | | | 370/329 |
| 2014/0133471 A1 | 5/2014 | Nammi et al. | |
| 2014/0301324 A1* | 10/2014 | Cheng .................. | H04L 5/0055 |
| | | | 370/329 |
| 2015/0229444 A1 | 8/2015 | Webb et al. | |
| 2015/0282130 A1 | 10/2015 | Webb et al. | |
| 2016/0323873 A1* | 11/2016 | Takeda .................... | H04L 5/001 |
| 2017/0005758 A1 | 1/2017 | Baldemair et al. | |
| 2019/0222255 A1* | 7/2019 | Nammi ................. | H04L 1/1864 |
| 2021/0185682 A1 | 6/2021 | Lee et al. | |

FOREIGN PATENT DOCUMENTS

| | | |
|---|---|---|
| CN | 101286828 A | 10/2008 |
| CN | 101931517 A | 12/2010 |
| JP | 2009290393 A | 12/2009 |
| JP | 2011507424 A | 3/2011 |
| JP | 2017509177 A | 3/2017 |
| WO | WO 2018064182 A1 | 4/2018 |

OTHER PUBLICATIONS

IEEE Computer Society, "Part 11: Wireless LAN Medium Access Control (MAC) and Physical Layer (PHY) Specifications; Amendment 1: Enhancements for High Efficiency WLAN," IEEE P802.11axTM/D4.0, Feb. 2019, 746 pages.

International Search Report, dated Apr. 14, 2020, for the corresponding International Patent Application No. PCT/JP2020/002162, 5 pages. (with English translation).

Latif et al., Quantenna Communications, "HARQ in EHT," doc.: IEEE 802.11-18/2029r1, Nov. 12, 2018, 12 pages.

* cited by examiner

AREA "WITHOUT" EXTENDED RANGE OR DCM OPERATION

AREA "WITH" EXTENDED RANGE OR DCM OPERATION

100

200

| EXTENDED RANGE OPERATION | ON | OFF |
|---|---|---|
| HARQ OPERATION RULE EXAMPLE 1 | ACTIVE | INACTIVE |
| HARQ OPERATION RULE EXAMPLE 2 | TYPE: CC | TYPE: IR |

FIG. 10

| DCM OPERATION | ON | OFF |
|---|---|---|
| HARQ OPERATION RULE EXAMPLE 1 | ACTIVE | INACTIVE |
| HARQ OPERATION RULE EXAMPLE 2 | TYPE: CC | TYPE: IR |

FIG. 11

| EXTENDED RANGE OPERATION | ON | | OFF | |
|---|---|---|---|---|
| DCM OPERATION | ON | OFF | ON | OFF |
| HARQ OPERATION RULE EXAMPLE 1 | ACTIVE | INACTIVE | INACTIVE | INACTIVE |
| HARQ OPERATION RULE EXAMPLE 2 | TYPE: CC | TYPE: IR | TYPE: IR | TYPE: IR |

FIG. 12

| MCS | 0 to 4 | 5 to 11 |
|---|---|---|
| HARQ OPERATION RULE EXAMPLE 1 | ACTIVE | INACTIVE |
| HARQ OPERATION RULE EXAMPLE 2 | TYPE: CC | TYPE: IR |

FIG. 13

| NUMBER OF SPACE TIME STREAMS | 0 to 4 | 5 to 16 |
|---|---|---|
| HARQ OPERATION RULE EXAMPLE 1 | ACTIVE | INACTIVE |
| HARQ OPERATION RULE EXAMPLE 2 | TYPE: CC | TYPE: IR |

FIG. 14

| BANDWIDTH | 20/40 MHz | 80 MHz OR MORE |
|---|---|---|
| HARQ OPERATION RULE EXAMPLE 1 | ACTIVE | INACTIVE |
| HARQ OPERATION RULE EXAMPLE 2 | TYPE: CC | TYPE: IR |

FIG. 15

| RU ALLOCATION | 242 TONES OR LESS | 484 TONES OR MORE |
|---|---|---|
| HARQ OPERATION RULE EXAMPLE 1 | ACTIVE | INACTIVE |
| HARQ OPERATION RULE EXAMPLE 2 | TYPE: CC | TYPE: IR |

FIG. 16

| SIG-A PORTION | BIT | FIELD | NUMBER OF BITS | DESCRIPTION |
|---|---|---|---|---|
| SIG-A1 | | | | ... |
| | B3–B6 | MCS | 4 | MCSn, n=0, 1, 2, ···, 11 (12 to 15 are reserved) |
| | B7 | DCM | 1 | DCM application indication to data field: 0 setting<br>   0:DCM is not applied to data field<br>   1:DCM is applied to data field<br>MCS 0, 1, 3, or 4 for DCM<br>DCM applies 1 or 2 of space streams<br>DCM is not applied in combination with STBC |
| | | | | ... |
| | B19–B20 | BANDWIDTH | 2 | 0: 20 MHz<br>1: 40 MHz<br>2: 80 MHz<br>3: 160 MHz and 80+80 MHz |
| | | | | ... |
| | B23–B25 | NSTS and MIDAMBLE PERIODICITY | 3 | When Doppler field is 0,<br>  B23–B25: Number of space streams − 1 (0 to7)<br>When Doppler field is 1,<br>  B23–B24: Number of space streams − 1 (0 to3)<br>  B25: Midamble periodicity |
| SIG-A2 | | | | ... |
| | B9 | STBC | 1 | STBC application indication to data field:<br>  0: STBC not applied<br>  1: STBC applied<br>DCM is not applied in combination with STBC |
| | | | | ... |

FIG. 18

| SIG-A PORTION | BIT | FIELD | NUMBER OF BITS | DESCRIPTION |
|---|---|---|---|---|
| SIG-A1 | | | | ... |
| | B3-B6 | MCS | 4 | <u>During Extended Range operation</u><br>When bandwidth field is 0(242-tone RU):<br>·B3-B4:MCSn, n=0, 1, 2<br>·B5-B6:HARQ related signaling defined (2 bits)<br>When bandwidth field is 1<br>(upper frequency 106-tone RU):<br>·B3:MCS0 (0 setting)<br>·B4-B6:HARQ related signaling defined (3 bits) |
| | | | | ... |
| | B19-B20 | BANDWIDTH | 2 | <u>During Extended Range operation</u><br>·B19:Set 0 for 242-tone RU<br>     Set 1 for upper frequency 106-tone RU<br>     within the primary 20 MHz<br>·B20:HARQ related signaling defined (1 bit) |
| | | | | ... |
| | B23-B25 | NSTS and MIDAMBLE PERIODICITY | 3 | <u>During Extended Range operation</u><br>When Doppler field is 0,<br>  B23: Number of space streams − 1<br>  B24-B25: HARQ related signaling defined (2 bits)<br>When Doppler field is 1,<br>  B23: Number of space streams − 1<br>  B24: HARQ related signaling defined (1 bit)<br>  B25: Midamble periodicity |
| SIG-A3 | | | | ... |

FIG. 20

| SIG-A PORTION | BIT | FIELD | NUMBER OF BITS | DESCRIPTION |
|---|---|---|---|---|
| SIG-A1 | | | | ... |
| | B3-B6 | MCS | 4 | <u>During DCM operation</u><br>・B3-B5:MCSn, n=0, 1, 3, 4<br>・B6:HARQ related signaling defined (1 bit) |
| | B7 | DCM | 1 | DCM application indication to data field: 1 setting<br>　　0:DCM is not applied to data field<br>　　1:DCM is applied to data field<br>MCS 0, 1, 3, or 4 for DCM<br>DCM applies 1 or 2 of space streams<br>DCM is not applied in combination with STBC |
| | | | | ... |
| | B19-B20 | BANDWIDTH | 2 | 0: 20 MHz<br>1: 40 MHz<br>2: 80 MHz<br>3: 160 MHz and 80+80 MHz |
| | | | | ... |
| | B23-B25 | NSTS and MIDAMBLE PERIODICITY | 3 | <u>During DCM operation</u><br>B23: Number of space streams − 1<br>B24-B25: HARQ related signaling defined (2 bits) |
| SIG-A2 | | | | ... |
| | B9 | STBC | 1 | DCM is not applied in combination with STBC<br>→HARQ related signaling defined (1 bit) |
| | | | | ... |

FIG. 21

| HARQ OPERATION | ON | OFF |
|---|---|---|
| Extended Range | ACTIVE | INACTIVE |
| DCM | ACTIVE | INACTIVE |

FIG. 25

| HARQ OPERATION | ON | OFF |
|---|---|---|
| Extended Range | ACTIVE | INACTIVE |
| DCM | INACTIVE | INACTIVE |

FIG. 26

| HARQ OPERATION | ON | OFF |
|---|---|---|
| Extended Range | INACTIVE | INACTIVE |
| DCM | ACTIVE | INACTIVE |

FIG. 27

| MCS (4 bits) | 0 to 11<br>12 to 15 : Reserved |
|---|---|
| NSTS-1 (4 bits) | 0 to 15 |
| BANDWIDTH (3 bits) | 0: 20 MHz<br>1: 40 MHz<br>2: 80 MHz<br>3: 160 MHz<br>4: 320 MHz<br>(5 to 7: Reserved) |
| STBC (1 bit) | 0: OFF<br>1: ON |

FIG. 29

| MCS (4 bits) | Bit0-1: MCS 0 to 2<br>Bit2: HARQ Initial transmission/Retransmission<br>Bit3: HARQ type (CC/IR) |
|---|---|
| NSTS-1 (4 bits) | Bit0: Number of STSs (1/2)<br>Bit1-3: RV |
| BANDWIDTH (3 bits) | Bit0: RU size (242/106 tones)<br>Bit1-2: HARQ process number (lower bits) |
| STBC (1 bit) | Bit0: HARQ process number (higher bit) |

FIG. 30

BASE STATION, TERMINAL AND COMMUNICATION METHOD

TECHNICAL FIELD

The present disclosure relates to a base station, a terminal, and a communication method.

BACKGROUND ART

Studies have been carried out on The Institute of Electrical and Electronics Engineers (IEEE) 802.11be standard for the next generation radio Local Area Network (LAN), which is the successor to the IEEE 802.11ax standard of IEEE 802.11. The IEEE 802.11be is also referred to as Extreme High Throughput (EHT), for example.

Retransmission control (e.g., Hybrid Automatic Repeat Request (HARQ)) is considered to be introduced into the IEEE 802.11be (see, for example, Non Patent Literature (hereinafter, referred to as NPL) 1).

CITATION LIST

Non Patent Literature

NPL 1
    IEEE 802.11-18/2029r1, HARQ in EHT
NPL 2
    IEEE P802.11ax™/D4.0

SUMMARY OF INVENTION

However, there is scope for further study on a retransmission control method according to communication quality in radio communication in a wireless LAN or the like.

One non-limiting and exemplary embodiment facilitates providing a base station, a terminal, and a communication method each capable of improving retransmission control efficiency according to communication quality.

A base station according to an embodiment of the present disclosure includes: control circuitry, which, in operation, determines one of a communication parameter configured according to communication quality and an operation of retransmission control based on the other; and communication circuitry, which, in operation, performs communication with a terminal based on the determined communication parameter or the determined operation of the retransmission control.

It should be noted that general or specific embodiments may be implemented as a system, an apparatus, a method, an integrated circuit, a computer program, a storage medium, or any selective combination thereof.

According to an embodiment of the present disclosure, it is possible to improve retransmission control efficiency according to communication quality.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 10 illustrates exemplary associations between a communication mode and HARQ operations according to Embodiment 1;

FIG. 11 illustrates exemplary associations between another communication mode and the HARQ operations according to Embodiment 1;

FIG. 12 illustrates exemplary associations between the communication modes and the HARQ operations according to Embodiment 1;

FIG. 13 illustrates exemplary associations between MCS and the HARQ operations according to Embodiment 1;

FIG. 14 illustrates exemplary associations between the number of space time streams and the HARQ operations according to Embodiment 1;

FIG. 15 illustrates exemplary associations between a bandwidth and the HARQ operations according to Embodiment 1;

FIG. 16 illustrates exemplary associations between Resource Unit (RU) allocation and the HARQ operations according to Embodiment 1;

FIG. 18 illustrates an exemplary configuration of SIG-A according to Embodiment 1;

FIG. 20 illustrates another exemplary configuration of the SIG-A according to Embodiment 1;

FIG. 21 illustrates still another exemplary configuration of the SIG-A according to Embodiment 1;

FIG. 25 illustrates exemplary associations between a HARQ operation and communication modes according to Embodiment 2;

FIG. 26 illustrates other exemplary associations between the HARQ operation and the communication modes according to Embodiment 2;

FIG. 27 illustrates still other exemplary associations between the HARQ operation and the communication modes according to Embodiment 2;

3

Figure 28:
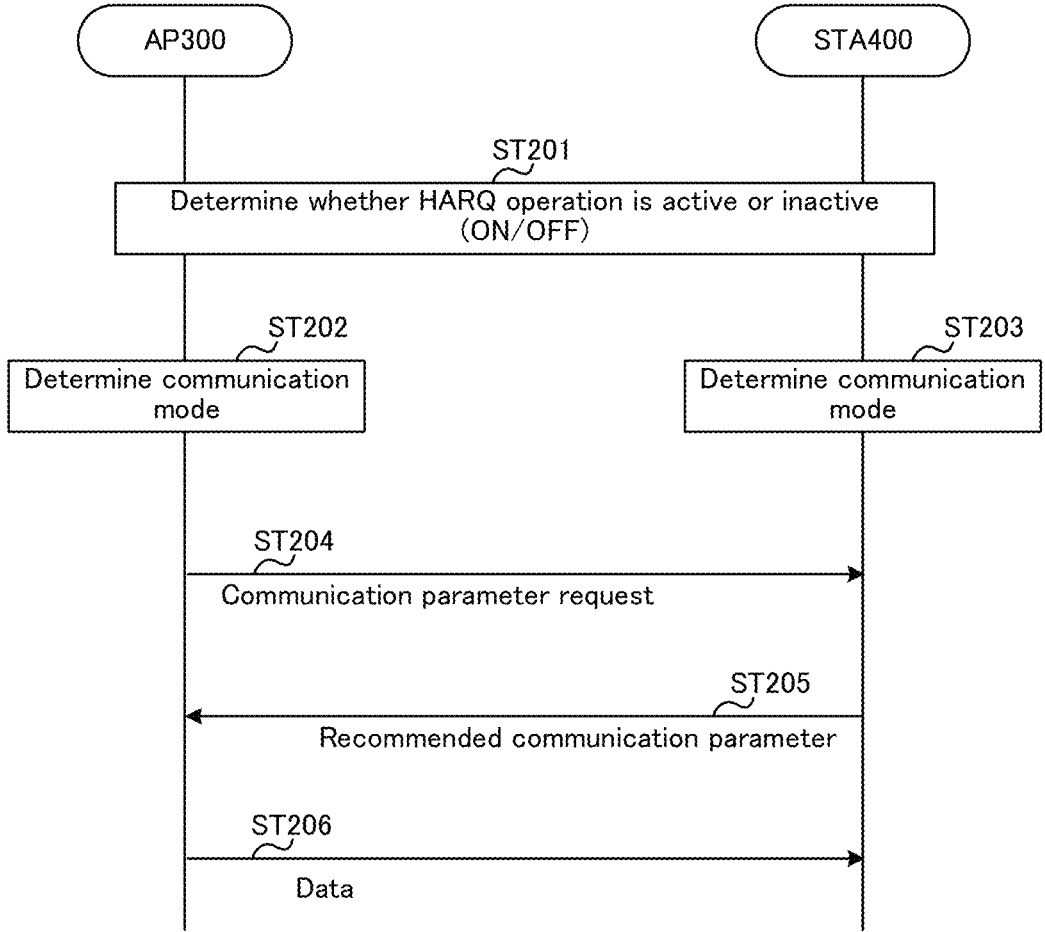
Figure 31:
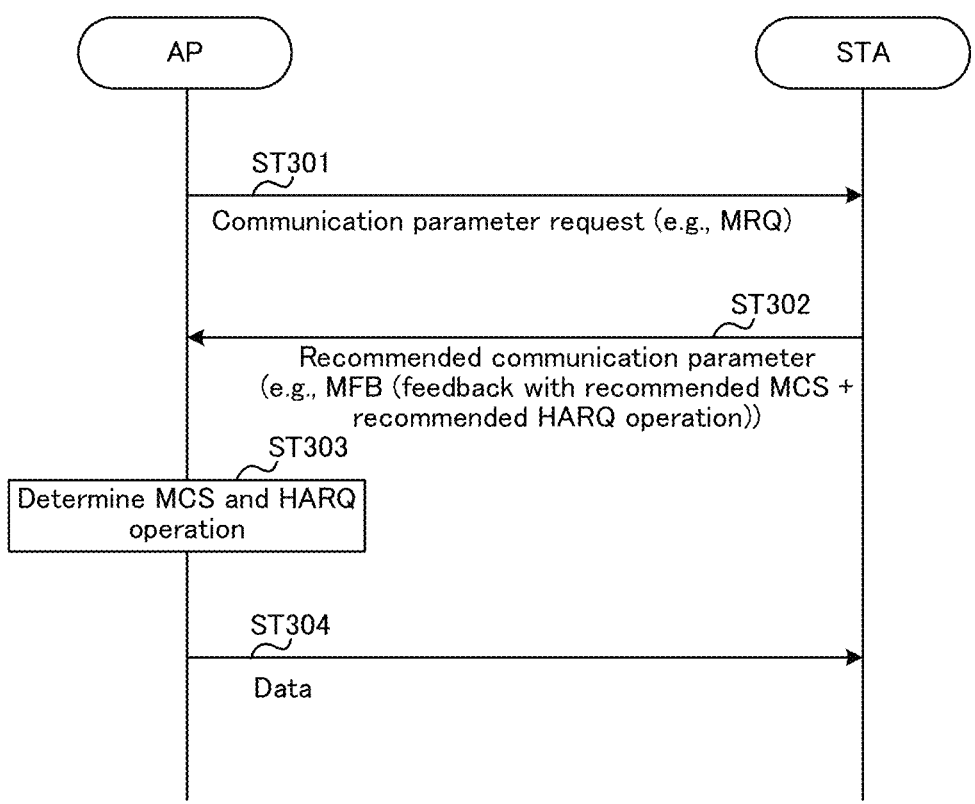

FIG. 28 is a sequence diagram describing an exemplary operation of a radio communication system according to Embodiment 2;

FIG. 29 illustrates exemplary configurations of communication parameters according to Embodiment 2;

FIG. 30 illustrates other exemplary configurations of the communication parameters according to Embodiment 2; and FIG. 31 is a sequence diagram describing an exemplary operation of a radio communication system according to Embodiment 3.

DESCRIPTION OF EMBODIMENTS

Hereinafter, embodiments of the present disclosure will be described in detail with reference to the accompanying drawings.

HARQ Control

HARQ is retransmission control in a physical (PHY) layer and different from retransmission control in a Medium Access Control (MAC) layer. In the HARQ, a terminal (also referred to as a station (STA)), for example, holds packet data with an error in the physical layer among packet data transmitted from an access point (AP; or also referred to as a base station), and requests retransmission. The STA combines the physical layer packet data retransmitted from the AP with the held packet data, for example. The HARQ improves the reception performance of the STA, thus improving the throughput.

Retransmission schemes for the HARQ (or also referred to as HARQ types) include, for example, two schemes of Chase combining (CC) and Incremental redundancy (IR). The CC is a scheme of retransmitting the same packet as that in new transmission (or initial transmission). Meanwhile, the IR is a scheme of adding a new parity bit at the time of retransmission and improving coding gain.

For the IEEE 802.11be, for example, studies have been conducted on whether to adopt either one or both of the above HARQ types, or how the HARQ mechanism is incorporated into the wireless LAN system.

Figure 1:
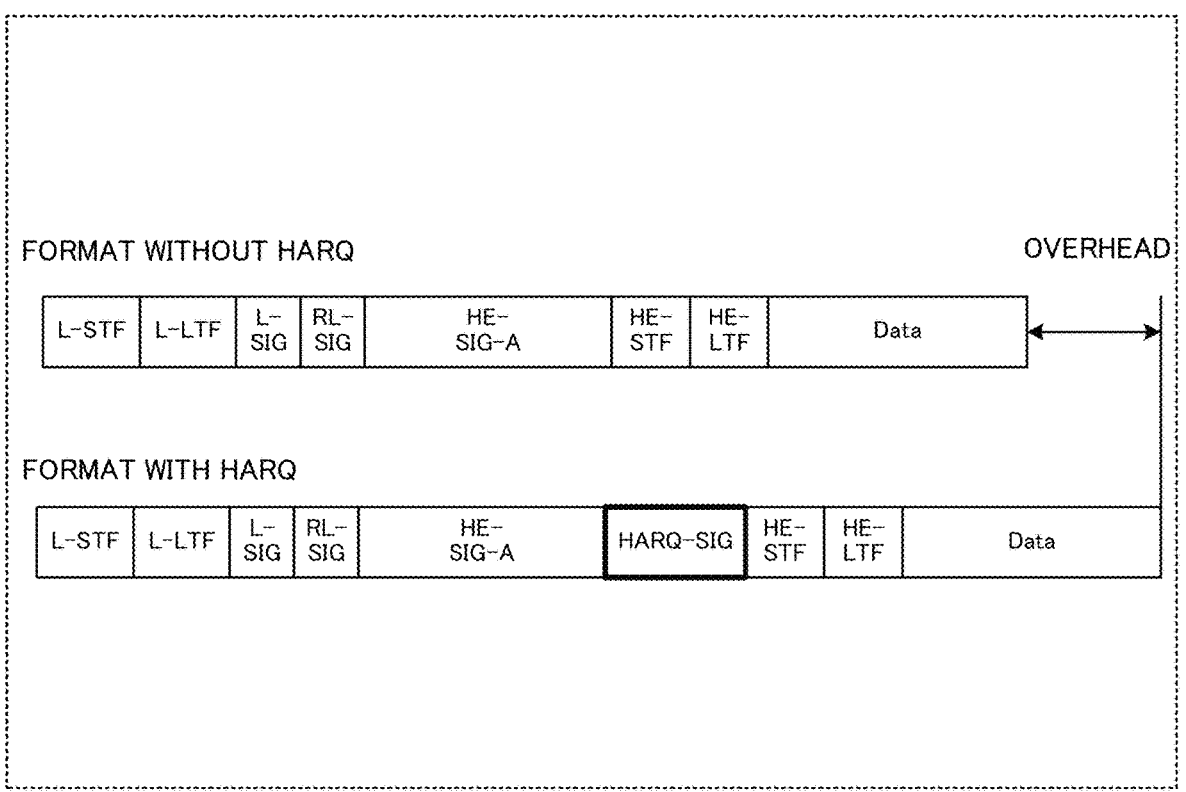
FIG. 1 illustrates exemplary configurations of a PHY Protocol Data Unit (PPDU)

There is also scope for further study on a method of indicating signaling on HARQ control in the IEEE 802.11be. For example, in a case where a field (e.g., indicated as "HARQ-SIG") to which the signaling on HARQ control is assigned is added to SIG-A or another area as illustrated in FIG. 1, the overhead increases and the throughput reduces.

With this regard, an embodiment of the present disclosure provides a description of a method of improving efficiency of HARQ control according to communication quality.

[Extended Range and DCM]

Communication modes such as an Extended Range (ER) and a Dual Carrier Modulation (DCM) scheme are introduced to the IEEE 802.11ax (see, for example, NPL 2). The Extended Range can extend a communication range, for example. The DCM can improve the robustness, for example.

The Extended Range realizes the extension of a communication range by, for example, the following methods (1) and (2).

Figure 2:
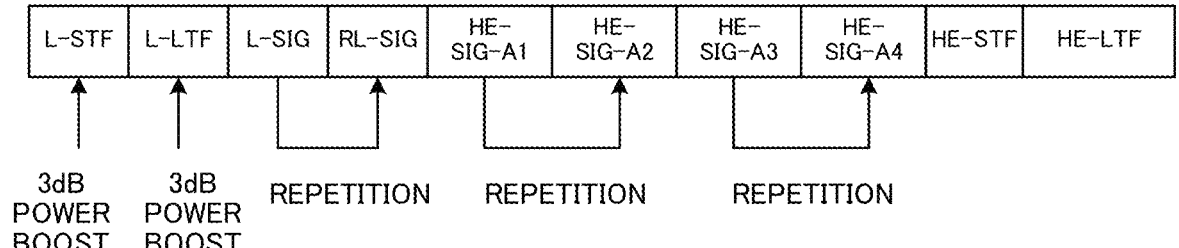
FIG. 2 illustrates an exemplary configuration of a preamble during an Extended Range operation.

(1) In the Extended Range, a power boost (e.g., 3 dB power boost) is performed, for example, on at least one of a Legacy-Short Training Field (L-STF) and a Legacy-Long Training Field (L-LTF) in a PPDU format (see, for example, FIG. 2). Alternatively, in the Extended Range, for example, repetitive transmission (i.e., repetition) of at least one of a Legacy-SIGNAL (L-SIG) and a High Efficiency-SIGNAL-A (HE-SIG-A) is performed in the PPDU format (see, for example, FIG. 2). The power boost and the repetitive transmission improve (i.e., mitigate) reception quality of a preamble (e.g., also referred to as preamble performance) on a receiving side.

(2) some of the parameters available for communication are configured during the Extended Range operation. In other words, configurable parameters are limited to a few during the Extended Range operation. For example, a channel to be used is configured to be a primary 20 MHz channel, a Modulation and Coding Scheme (MCS) is configured to be any of MCSs 0, 1, and 2, the number of Space Time Streams (STSs) is configured to be 1 STS, and a Resource Unit (RU) size is configured to be 242 tones or 106 tones, during the Extended Range operation. This improves reliability of the communication.

Incidentally, a PPDU format dedicated to the Extended Range (e.g., "HE ER SU PPDU") is specified in the IEEE 802.11ax.

In the HE ER SU PPDU, the HE-SIG-A field is configured, for example, including four components of HE-SIG-A1, HE-SIG-A2, HE-SIG-A3 and HE-SIG-A4 as illustrated in FIG. 2. In FIG. 2, HE-SIG-A1 and HE-SIG-A2 include the same data (i.e., the repetitive transmission is applied), and HE-SIG-A3 and HE-SIG-A4 include the same data (i.e., the repetitive transmission is applied).

Figure 3:
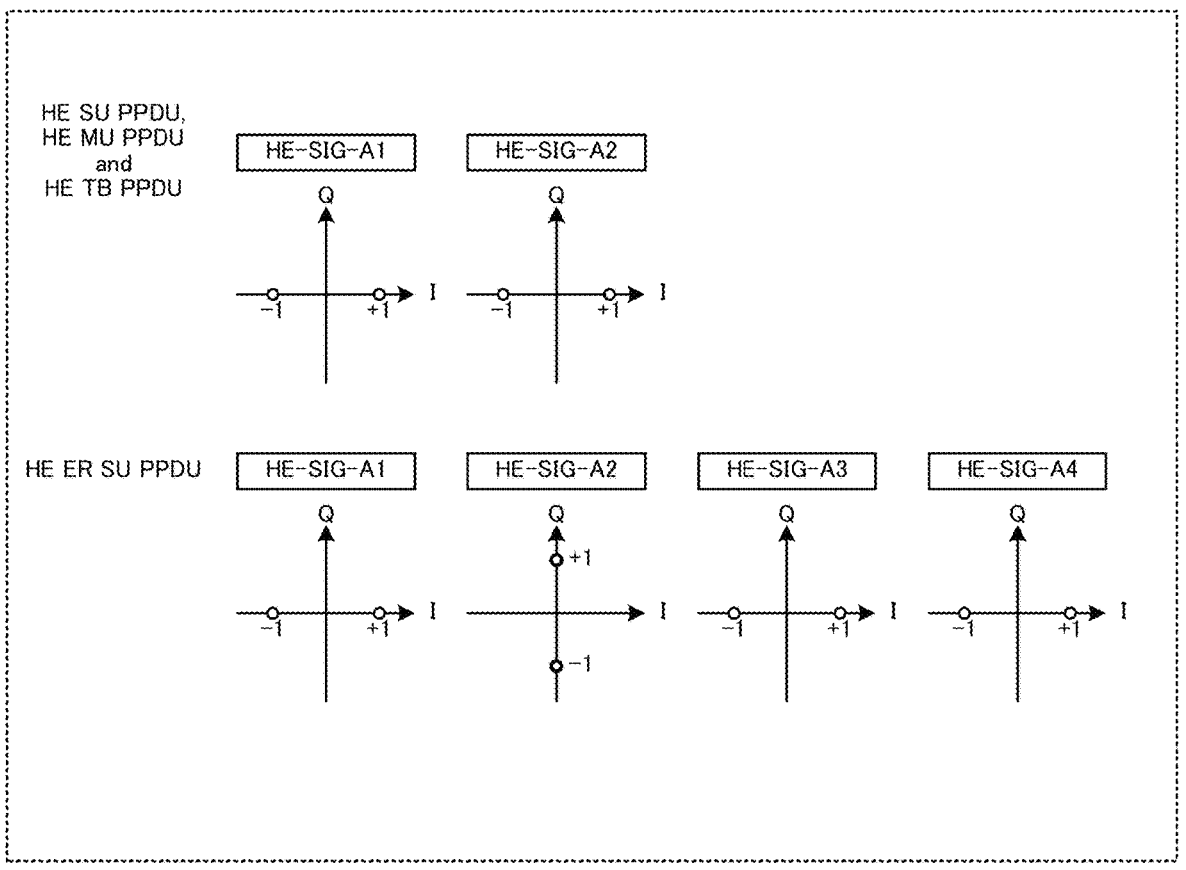
FIG. 3 illustrates exemplary constellations of HE-SIG-A symbols.

In addition, as illustrated in FIG. 3, in the HE ER SU PPDU format, the constellation of HE-SIG-A2 is Quadrature Binary Phase Shift Keying (QBPSK) obtained by phase-rotating the constellation (e.g., BPSK) of another HE-SIG-A (e.g., HE-SIG-A1, HE-SIG-A3 and HE-SIG-A4) by 90 degrees, for example. This allows an STA to distinguish between the HE ER SU PPDU format and another format based on the constellation of HE-SIG-A2. Thus, the STA can identify the HE ER-SU PPDU or another format before decoding HE-SIG-A, for example.

Figure 4:
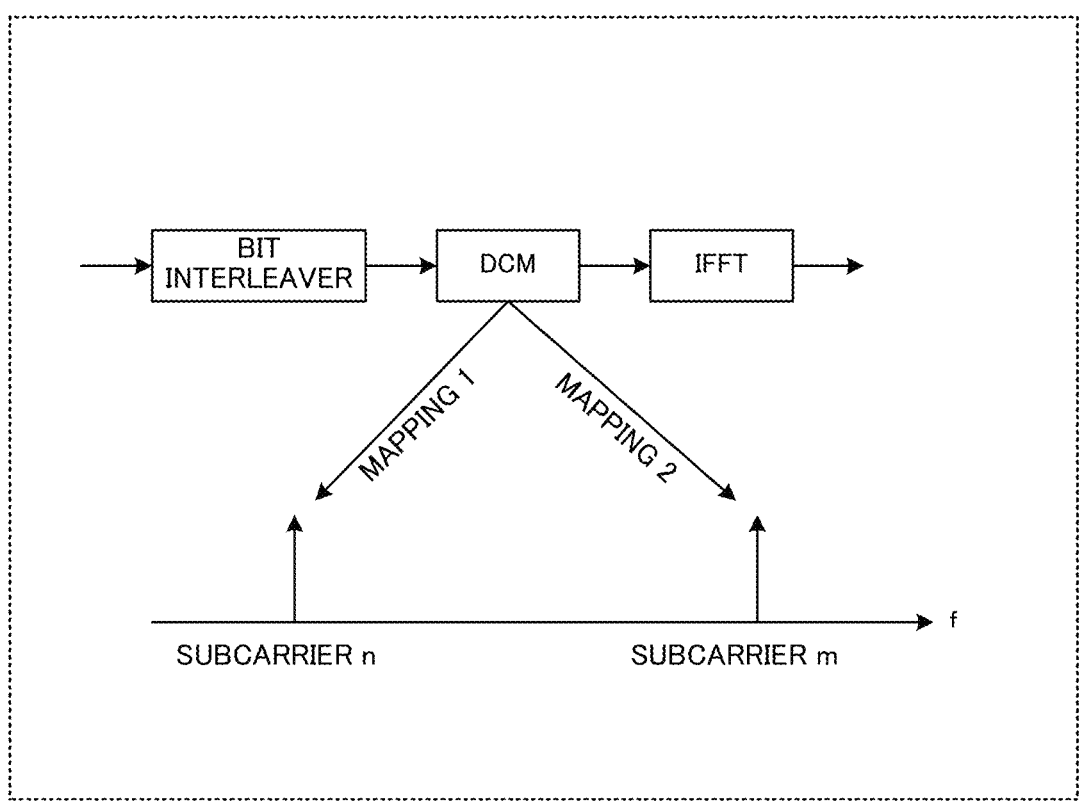
FIG. 4 illustrates an exemplary operation of Dual Carrier Modulation (DCM)

The DCM is a scheme of a transmission side performing different mappings (mappings 1 and 2 in FIG. 4) on the same information bit and transmitting the information bit in different subcarriers (subcarriers n and m in FIG. 4), for example, as illustrated in FIG. 4. The DCM brings a diversity effect in combining and decoding on a receiving side, thus improving the communication quality.

Some of the parameters available for the communication are configured during the DCM operation. In other words, configurable parameters are limited to a few during the DCM operation. For example, the MCS is configured to be any of MCSs 0, 1, 3, and 4, the number of STSs is configured to be either 1 or 2 STSs, and a combined operation of the DCM and Space-Time Block Coding (STBC) is not configured (in other words, no operation of STBC is configured), during the DCM operation.

The Extended Range and the DCM are considered to be introduced to in IEEE 802.11be as well.

Figure 5:
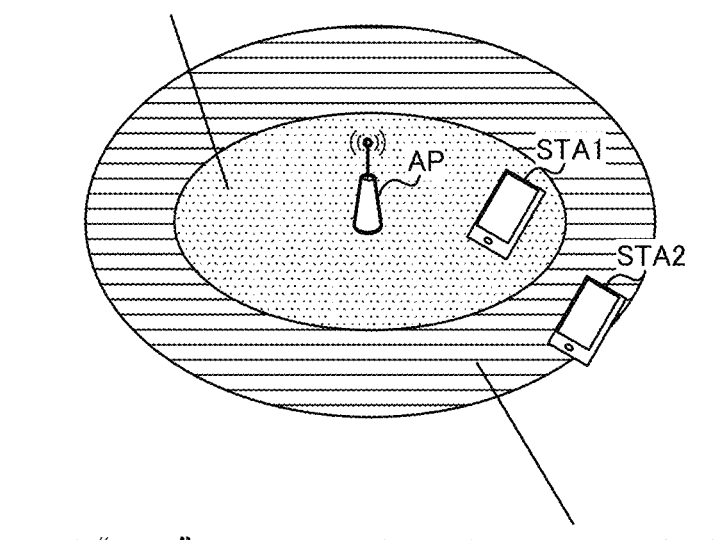
FIG. 5 illustrates an exemplary relation between Extended Range/DCM and a communication area.

Communication quality of the STA is determined, for example, according to the distance from the AP as illustrated in FIG. 5. In addition, the configuration (e.g., either ON or OFF) of the Extended Range and the DCM for the STA is possibly controlled, for example, based on the communication quality of the STA. For example, the STA closer to the AP (STA 1 in FIG. 5) has better communication quality, so that the Extended Range and the DCM are less likely to be configured. Meanwhile, the STA farther from the AP (STA 2 in FIG. 5) has poorer communication quality, so that the Extended Range and the DCM are more likely to be configured.

Further, the poorer the communication quality of the STA is, the higher the throughput improvement effect by the HARQ is. In other words, the HARQ operation (e.g., either ON or OFF) is possibly controlled based on the communication quality of the STA.

As described above, both the configuration of the communication mode such as the Extended Range and the DCM and the operation of HARQ control are possibly controlled according to the communication quality of the STA.

With this regard, an embodiment of the present disclosure provides a description of a method of associating a parameter (e.g., communication mode) configured according to the communication quality with the operation of HARQ control.

Note that the communication mode is not limited to the Extended Range and the DCM, and may be another parameter configured according to the communication quality. For example, the MCS, a Signal-to-Noise Ratio (SNR), the number of STSs, a bandwidth, or RU allocation may serve as such a parameter.

Further, the communication quality is not limited to being represented by the distance (i.e., communication range) between the AP and the STA as illustrated in FIG. 5, and may be represented by another parameter. For example, the communication quality may be represented by at least one of parameters such as the communication range, an interference amount, the SNR, and an error rate.

Embodiment 1

[Configuration of Radio Communication System]

A radio communication system according to the present embodiment includes at least one AP 100 and at least one STA 200.

Figure 6:
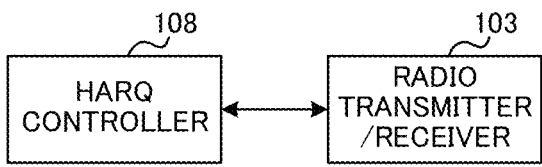
FIG. 6 is a block diagram illustrating an exemplary configuration of a part of an access point (AP; or also referred to as a base station) according to Embodiment 1.

FIG. 6 is a block diagram illustrating an exemplary configuration of a part of AP 100 according to an embodiment of the present disclosure. In AP 100 illustrated in FIG. 6, HARQ controller 108 (e.g., corresponding to control circuitry) determines one of a communication parameter (e.g., communication mode) configured according to the communication quality and an operation of retransmission control (e.g., HARQ operation) based on the other. Radio transmitter/receiver 103 (e.g., corresponding to communication circuitry) performs communication with STA 200 (e.g., terminal) based on the determined communication parameter or retransmission control operation.

Figure 7:
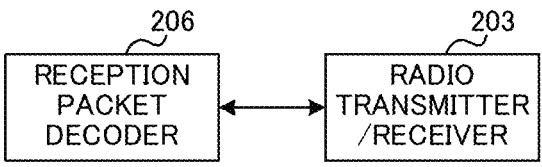
FIG. 7 is a block diagram illustrating an exemplary configuration of a part of a terminal (or also referred to as a station (STA)) according to Embodiment 1.

FIG. 7 is a block diagram illustrating an exemplary configuration of a part of STA 200 according to an embodiment of the present disclosure. In STA 200 illustrated in FIG. 7, reception packet decoder 206 (e.g., corresponding to control circuitry) determines one of a communication parameter configured according to the communication quality and an operation of retransmission control based on the other. Radio transmitter/receiver 203 (corresponding to communication circuitry) performs communication with AP 100 (e.g., base station) based on the determined communication parameter or retransmission control operation.

<Configuration of AP 100>

Figure 8:
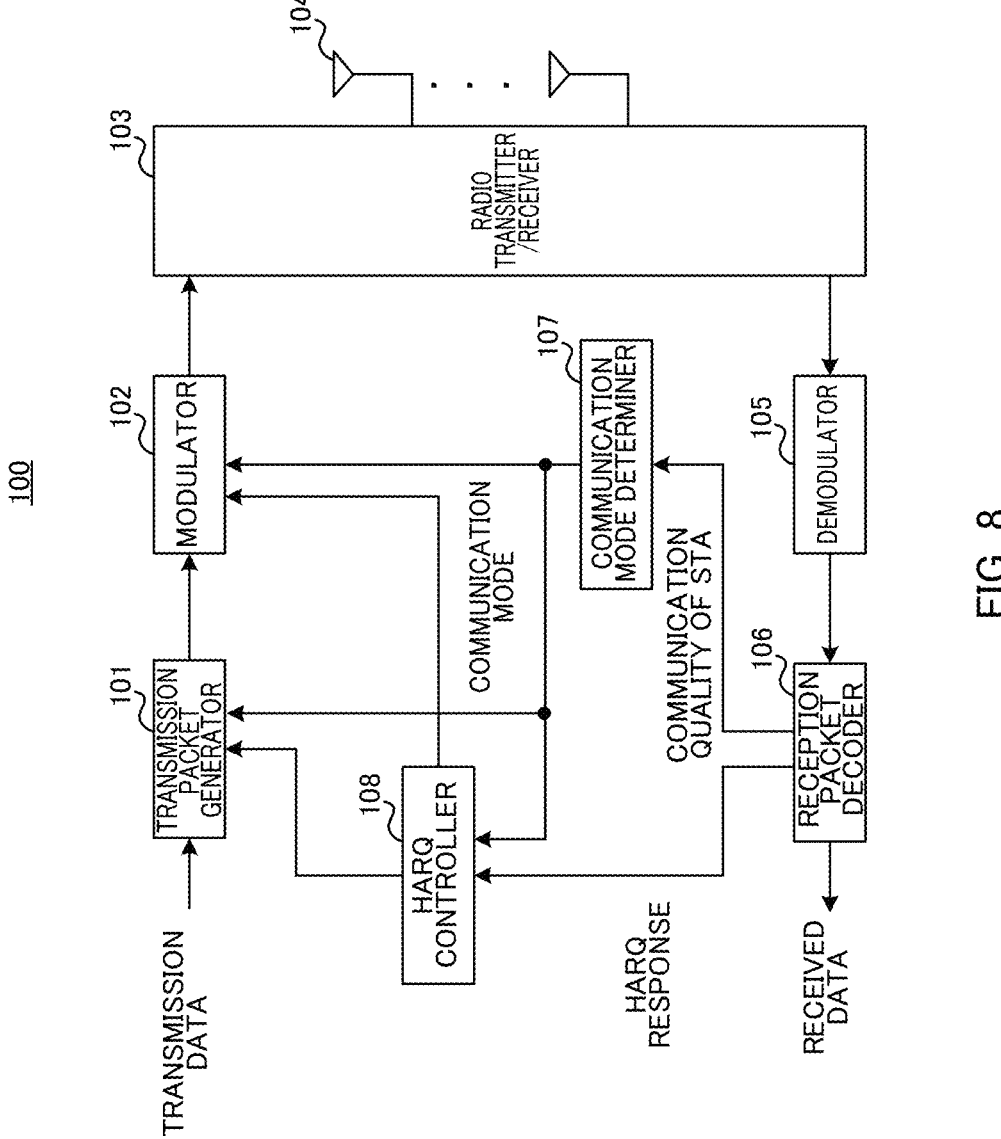
FIG. 8 is a block diagram illustrating an exemplary configuration of the AP according to Embodiment 1.

FIG. 8 is a block diagram illustrating an exemplary configuration of AP 100. AP 100 illustrated in FIG. 8 includes, for example, transmission packet generator 101, modulator 102, radio transmitter/receiver 103, antenna 104, demodulator 105, reception packet decoder 106, communication mode determiner 107, and HARQ controller 108.

Transmission packet generator 101 generates a transmission packet configured with, for example, a preamble and data therein based on transmission data to be inputted. For example, the transmission packet may include communication mode information on a communication mode (e.g., Extended Range, DCM, etc.) inputted from communication mode determiner 107, and HARQ control information on HARQ control inputted from HARQ controller 108. Transmission packet generator 101 outputs the generated transmission packet to modulator 102.

Modulator 102 performs modulation processing on the transmission packet inputted from transmission packet generator 101. Modulator 102 may configure, for example, the constellation of SIG-A2 to be the QBPSK as illustrated in FIG. 3 when the information inputted from communication mode determiner 107 indicates the Extended Range operation. For example, when the HARQ control information and at least one of the constellations of SIG-A2 to SIG-A4 are defined in association with each other, modulator 102 may configure the constellations of SIG-A2 to SIG-A4 in association with the HARQ control information. Modulator 102 outputs the modulated signal to radio transmitter/receiver 103.

Radio transmitter/receiver 103 performs communication with STA 200, for example. Radio transmitter/receiver 103 performs radio transmission processing on the signal inputted from modulator 102, for example, and transmits the radio signal from antenna 104. Radio transmitter/receiver 103 also performs radio reception processing on a radio signal received by antenna 104, and outputs the received signal after the radio reception processing to demodulator 105.

Demodulator 105 performs demodulation processing on the received signal inputted from radio transmitter/receiver 103, and outputs the demodulated signal to reception packet decoder 106.

Reception packet decoder 106 performs decoding processing on the signal (including the preamble and data transmitted from STA 200, for example) inputted from demodulator 105. Reception packet decoder 106 outputs, for example, information indicating the communication quality of STA 200 included in the decoded signal to communication mode determiner 107. Reception packet decoder 106 also outputs, to HARQ controller 108, a signal (e.g., also referred to as a HARQ response, HARQ-ACK, or ACK/NACK) indicating a response to the transmission packet transmitted from STA 200. Additionally, reception packet decoder 106 outputs data (i.e., received data) included in the decoded signals.

Communication mode determiner 107 determines a communication mode based on the communication quality of STA 200 indicated in the information inputted from reception packet decoder 106. The communication mode may be, for example, at least one of the Extended Range and the DCM, or may be at least one of the parameters, such as the Extended Range, the DCM, the MCS, the number of STSs, the bandwidth, and the RU allocation information, determined according to the communication quality. Communication mode determiner 107 outputs communication mode information indicating the determined communication mode to transmission packet generator 101, modulator 102 and HARQ controller 108.

HARQ controller 108 controls transmission processing (e.g., initial transmission or retransmission) of a transmission packet based on the information (e.g., HARQ response) inputted from reception packet decoder 106. For example, HARQ controller 108 performs initial transmission control of a transmission packet when the HARQ response indicates Acknowledgement (ACK), and performs retransmission control of a transmission packet when the HARQ response indicates Non-Acknowledgement (NACK). In the retransmission of the transmission packet, for example, HARQ controller 108 configures a value of a New Data Indicator (NDI) indicating a retransmission instruction or retransmission. When the HARQ response is ACK, or when AP 100 receives neither ACK nor NACK, HARQ controller 108 configures a toggled NDI value indicating an initial transmission instruction or initial transmission.

Further, HARQ controller 108 determines the HARQ operation based on the communication mode information inputted from communication mode determiner 107. Note that exemplary methods of determining the HARQ operation based on the communication mode in HARQ controller 108 will be described later.

HARQ controller 108 outputs HARQ control information indicating the content of the HARQ control to, for example, transmission packet generator 101 and modulator 102.

<Configuration of STA 200>

Figure 9:
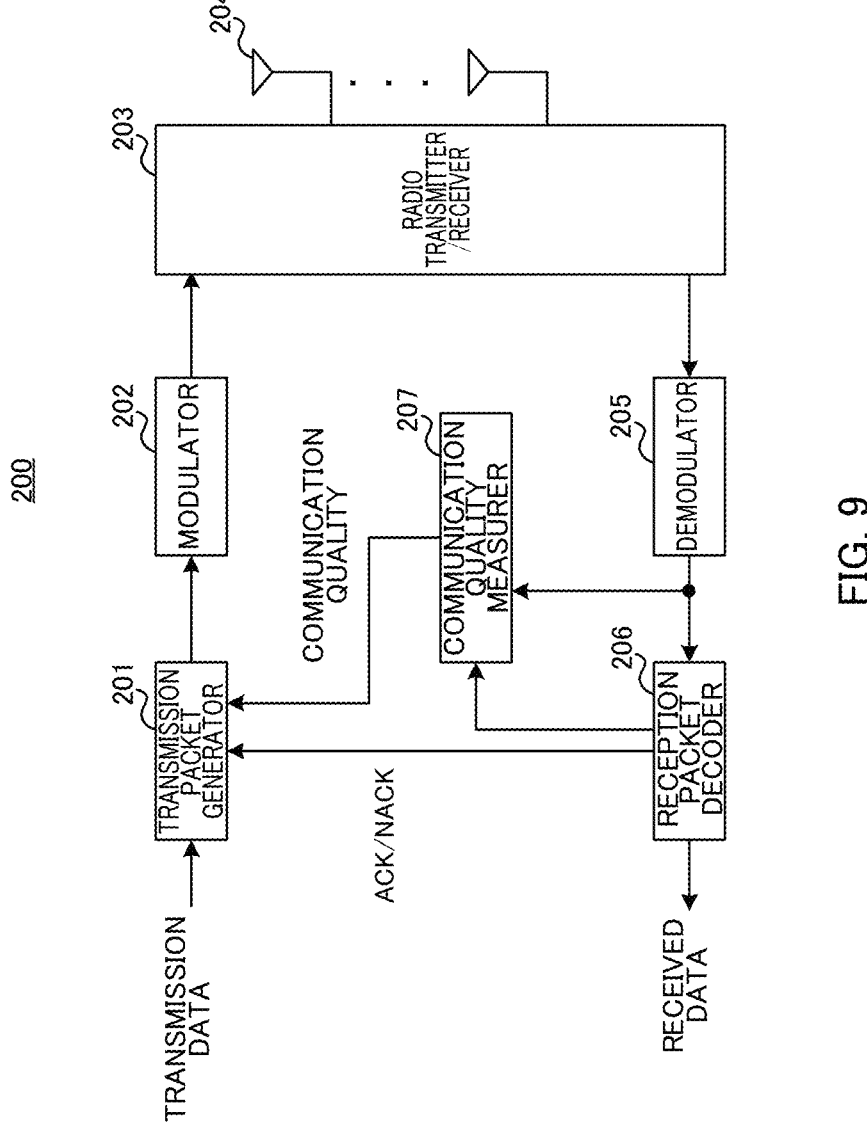
FIG. 9 is a block diagram illustrating an exemplary configuration of the STA according to Embodiment 1.

FIG. 9 is a block diagram illustrating an exemplary configuration of STA 200. STA 200 illustrated in FIG. 9 includes, for example, transmission packet generator 201, modulator 202, radio transmitter/receiver 203, antenna 204, demodulator 205, reception packet decoder 206, and communication quality measurer 207.

Transmission packet generator 201 generates a transmission packet configured with, for example, a preamble and data therein based on transmission data to be inputted. The transmission packet may include, for example, communication quality information on the communication quality inputted from communication quality measurer 207 and ACK/NACK information inputted from reception packet decoder 206. Transmission packet generator 201 outputs the generated transmission packet to modulator 202.

Modulator 202 performs modulation processing on the transmission packet inputted from transmission packet generator 201. Modulator 202 outputs the modulated signal to radio transmitter/receiver 203.

Radio transmitter/receiver 203 performs communication with AP 100, for example. Radio transmitter/receiver 203 performs radio transmission processing on the signal inputted from modulator 202, for example, and transmits the radio signal from antenna 204. Radio transmitter/receiver 203 also performs radio reception processing on a radio signal received by antenna 204, and outputs the received signal after the radio reception processing to demodulator 205.

Demodulator 205 performs demodulation processing on the received signal inputted from radio transmitter/receiver 203, and outputs the demodulated signal to reception packet decoder 206 and communication quality measurer 207.

Reception packet decoder 206 performs decoding processing on the signal (including the preamble and data transmitted from AP 100, for example) inputted from demodulator 205. Reception packet decoder 206 outputs, for example, received data (i.e., reception packet data) included in the decoded signal.

In addition, reception packet decoder 206 determines the HARQ operation, as is the case with HARQ controller 108 of AP 100, based on the communication mode configured by a control signal included in the reception packet, for example. Note that exemplary methods of determining the HARQ operation based on the communication mode in reception packet decoder 206 will be described later.

In a case of performing the HARQ operation, for example, reception packet decoder 206 performs error detection on the received data, and outputs ACK/NACK information (ACK or NACK) based on the error detection result to transmission packet generator 201. When the received data has an error, for example, reception packet decoder 206 holds the received data, generates the ACK/NACK information to request the retransmission (NACK), and combines retransmitted packet data with the held received data. This improves the reception performance. Meanwhile, when the received data has no error, reception packet decoder 206 generates the ACK/NACK information indicating ACK.

Communication quality measurer 207 measures, for example, the communication quality between AP 100 and STA 200 based on the demodulated signal inputted from demodulator 205. The communication quality may include, for example, an SNR, a communication range, propagation loss, an interference amount, an error rate, or information indicating quality such as Channel Quality Information (CQI). Communication quality measurer 207 outputs communication quality information indicating the measured communication quality to transmission packet generator 201.

Note that either the MAC layer or the physical layer may be used for the feedback of ACK/NACK information in an embodiment of the present disclosure. For example, an "ACK/NACK frame format" for explicitly indicating ACK/NACK as one of MAC frame formats may be defined as a format of ACK/NACK information as well as an "ACK frame format" defined as one of the MAC frame formats in the IEEE 802.11ax. Alternatively, the format of ACK/NACK information may be defined being included in signaling in the physical layer. In addition, it is possible to switch between retransmission control in the MAC layer level in the IEEE 802.11ax and the HARQ retransmission control in the physical layer level in an embodiment of the present disclosure.

Further, one of the formats for acknowledging a plurality of MAC Protocol Data Units (MPDUs) is a "block ACK frame format". In an embodiment of the present disclosure, a "block ACK/NACK frame format" including NACK information in addition to ACK information may be defined in a case of the HARQ retransmission. The target of the block ACK/NACK may be ACK/NACK corresponding to the MPDU, or ACK/NACK corresponding to each of a plurality of divisions of the PPDU. Furthermore, it is possible to switch between the block ACK frame format and the block ACK/NACK frame format for the HARQ in an embodiment of the present disclosure.

[Association Between Communication Mode and HARQ Operation]

Next, associations between the communication mode and the HARQ operation according to the present embodiment will be described.

As an example here, a description will be given of the associations between the communication mode for which at least one of the Extended Range and the DCM is configured and the HARQ operation.

Configuration Examples 1 to 3 of the associations between the communication mode and the HARQ operation will be each described below.

Configuration Example 1

In Configuration Example 1, the HARQ operations or the HARQ types are switched based on the Extended Range configuration.

FIG. 10 illustrates exemplary associations between the Extended Range configuration and the HARQ operations.

In an environment where the Extended Range is active (e.g., represented as Extended Range operation: ON), STA 200 is, for example, likely to have low communication quality (e.g., the communication quality lower than a threshold), and the HARQ operation brings a great improvement effect on the communication quality, so that the throughput is easily improved by the HARQ operation.

Meanwhile, in an environment where the Extended Range is inactive (e.g., represented as Extended Range operation: OFF), STA 200 is, for example, likely to have high communication quality (e.g., the communication quality equal to or higher than the threshold), and the HARQ operation brings little improvement effect on the communication quality. Thus, the HARQ operation is less likely to improve the throughput when the Extended Range is inactive.

With this regard, in HARQ operation rule example 1 illustrated in FIG. 10, for example, the HARQ operation is configured when the Extended Range is configured, and no HARQ operation is configured when no Extended Range is configured. Note that whether the HARQ operation or the communication mode (e.g., Extended Range and DCM) is configured may be represented as, for example, active/inactive, ON/OFF, valid/invalid, applied/not applied, activated/deactivated, or enabled/disabled.

In the low-quality environment where the Extended Range is active, the coding gain by the IR and the maximal ratio combining gain by the CC are possibly equivalent. Additionally, among the HARQ types, the control information amount of the CC is less than the control information amount of the IR. Thus, it is possible to reduce the overhead and improve the throughput by configuring the HARQ type to be the CC when the Extended Range is configured (in the case of ON), as in HARQ operation rule example 2 illustrated in FIG. 10.

Meanwhile, in the high-quality environment where no Extended Range is configured, the coding gain by the IR is greater than the maximal ratio combining gain by the CC. Thus, the HARQ type is configured to be the IR when no Extended Range is configured (in the case of OFF), as in HARQ operation rule example 2 illustrated in FIG. 10.

Configuration Example 2

In Configuration Example 2, the HARQ operations or the HARQ types are switched based on the DCM configuration.

FIG. 11 illustrates exemplary associations between the DCM configuration and the HARQ operations.

In an environment where the DCM is active (e.g., represented as DCM operation: ON), STA 200 is, for example, likely to have low communication quality (e.g., the communication quality lower than a threshold), and the HARQ operation brings a great improvement effect on the communication quality, so that the throughput is easily improved by the HARQ operation.

Meanwhile, in an environment where the DCM is inactive (e.g., represented as DCM operation: OFF), STA 200 is, for example, likely to have high communication quality (e.g., the communication quality equal to or higher than the threshold), and the HARQ operation brings little improvement effect on the communication quality. Thus, the HARQ operation is less likely to improve the throughput when the DCM is inactive.

With this regard, in HARQ operation rule example 1 illustrated in FIG. 11, for example, the HARQ operation is configured when the DCM is configured (in the case of ON), and no HARQ operation (inactive) is configured when no DCM is configured (in the case of OFF).

In the low-quality environment where the DCM is active, the coding gain by the IR and the maximal ratio combining gain by the CC are possibly equivalent. Additionally, among the HARQ types, the control information amount of the CC is less than the control information amount of the IR. Thus, it is possible to reduce the overhead and improve the throughput by configuring the HARQ type to be the CC when the DCM is configured (in the case of ON), as in HARQ operation rule example 2 illustrated in FIG. 11.

Meanwhile, in the high-quality environment where no DCM is configured, the coding gain by the IR is greater than the maximal ratio combining gain by the CC. Thus, the HARQ type is configured to be the IR when no DCM is configured (in the case of OFF), as in HARQ operation rule example 2 illustrated in FIG. 11.

Configuration Example 3

In Configuration Example 3, the HARQ operations or the HARQ types are switched based on a combination of the Extended Range configuration and the DCM configuration.

FIG. 12 illustrates exemplary associations between the combination of the Extended Range configuration and the DCM configuration and the HARQ operations.

In an environment where both the Extended Range and the DCM are active, for example, STA 200 is likely to have low communication quality (e.g., the communication quality lower than a threshold) compared to an environment where either the Extended Range or the DCM is active or neither is active. Thus, the HARQ operation brings a great improvement effect on the communication quality and the throughput is easily improved by the HARQ operation when both the Extended Range and the DCM are active, compared to the environment where either the Extended Range or the DCM is active or neither is active.

With this regard, in HARQ operation rule example 1 illustrated in FIG. 12, for example, the HARQ operation is configured when both the Extended Range and the DCM are configured (Extended Range operation: ON and DCM operation: ON). Additionally, in HARQ operation rule example 1 illustrated in FIG. 12, no HARQ operation (inactive) is configured when either the Extended Range or the DCM is configured, or when neither the Extended Range nor the DCM is configured.

In the low-quality environment where both the Extended Range and the DCM are active, the coding gain by the IR and the maximal ratio combining gain by the CC are possibly equivalent. In addition, among the HARQ types, the control information amount of the CC is less than the control information amount of the IR. Thus, it is possible to reduce the overhead and improve the throughput by configuring the HARQ type to be the CC when both the Extended Range and the DCM are configured, as in HARQ operation rule example 2 illustrated in FIG. 12.

Meanwhile, in the environment with the communication quality where at least one of the Extended Range and the DCM is inactive, the coding gain by the IR is greater than the maximal ratio combining gain by the CC, compared to the environment where both the Extended Range and the DCM are active. Thus, the HARQ type is configured to be the IR when either the Extended Range or the DCM is configured or when neither the Extended Range nor the DCM is configured, as in HARQ operation rule example 2 illustrated in FIG. 12.

Configuration Examples 1 to 3 have been described, thus far.

Note that the configuration of the communication mode is not limited to the configurations of the Extended Range and the DCM, and may be a configuration of another communication parameter. In the following, descriptions will be given of Configuration Examples 4 to 7 for the associations between the communication mode and the HARQ operations in cases of configuring the MCS, the number of STSs, the bandwidth, and the RU allocation as the communication mode, by way of example.

Configuration Example 4

In Configuration Example 4, the HARQ operations or the HARQ types are switched based on an MCS value configured for STA 200.

FIG. 13 illustrates exemplary associations between the MCS value configured for STA 200 and the HARQ operations.

For example, a smaller MCS value is possibly configured for STA 200 with lower communication quality. Thus, the smaller the MCS value is, the more easily the HARQ operation improves the communication quality and the throughput.

With this regard, in HARQ operation rule example 1 illustrated in FIG. 13, the HARQ operation is configured in a case of a small MCS value (e.g., any of MCS 0 to 4), and no HARQ operation (inactive) is configured in a case of a large MCS value (e.g., any of MCS 5 to 11), for example. In other words, the HARQ operation is switched between active and inactive based on the MCS configured for STA 200.

In the environment where a small MCS value is possibly configured, the coding gain by the IR and the maximal ratio combining gain by the CC are possibly equivalent. Additionally, among the HARQ types, the control information amount of the CC is less than the control information amount of the IR. Thus, it is possible to reduce the overhead and improve the throughput by configuring the HARQ type to be the CC in the case of a small MCS value (e.g., the MCS value equal to or less than a threshold), as in HARQ operation rule example 2 illustrated in FIG. 13.

Meanwhile, in the environment where a large MCS value is configured, the coding gain by the IR is greater than the maximal ratio combining gain by the CC. Thus, the HARQ type is configured to be the IR in the case of a large MCS value (e.g., any of MCS 5 to 11) as in HARQ operation rule example 2 illustrated in FIG. 13.

Configuration Example 5

In Configuration Example 5, the HARQ operations or the HARQ types are switched based on the number of STSs configured for STA 200.

FIG. 14 illustrates exemplary associations between the number of STSs configured for STA 200 and the HARQ operations.

For example, a smaller number of STSs is possibly configured for STA 200 with lower communication quality. Thus, the smaller the number of STSs is, the more easily the HARQ operation improves the communication quality and the throughput.

With this regard, in HARQ operation rule example 1 illustrated in FIG. 14, the HARQ operation is configured in a case of a small number of STSs (e.g., when the number of STSs is any of 1 to 4), and no HARQ operation (inactive) is configured in a case of a large number of STSs (e.g., when the number of STSs is any of 5 to 16), for example.

In the environment where a small number of STSs is possibly configured, the coding gain by the IR and the maximal ratio combining gain by the CC are possibly equivalent. Additionally, among the HARQ types, the control information amount of the CC is less than the control information amount of the IR. Thus, it is possible to reduce the overhead and improve the throughput by configuring the HARQ type to be the CC in the case of a small number of STSs (e.g., when the number of STSs is equal to or less than a threshold), as in HARQ operation rule example 2 illustrated in FIG. 14.

Meanwhile, in the environment where a larger number of STSs is configured, the coding gain by the IR is greater than the maximal ratio combining gain by the CC. Thus, the HARQ type is configured to be the IR in the case of a large number of STSs (e.g., when the number of STSs is any of 5 to 16) as in HARQ operation rule example 2 illustrated in FIG. 14.

Configuration Example 6

In Configuration Example 6, the HARQ operations or the HARQ types are switched based on a bandwidth configured for STA 200.

FIG. 15 illustrates exemplary associations between the bandwidth configured for STA 200 and the HARQ operations.

For example, a narrower bandwidth is possibly configured for STA 200 with lower communication quality. Thus, the narrower the bandwidth is, the more easily the HARQ operation improves the communication quality and the throughput.

With this regard, in HARQ operation rule example 1 illustrated in FIG. 15, the HARQ operation is configured in a case of a narrow bandwidth (e.g., when the bandwidth is 20 MHz or 40 MHz), and no HARQ operation (inactive) is configured in a case of a broad bandwidth (e.g., when the bandwidth is 80 MHz or more), for example.

In the environment where a narrow bandwidth is possibly configured, the coding gain by the IR and the maximal ratio combining gain by the CC are possibly equivalent. Additionally, among the HARQ types, the control information amount of the CC is less than the control information amount of the IR. Thus, it is possible to reduce the overhead and improve the throughput by configuring the HARQ type to be the CC in the case of a narrow bandwidth (e.g., the bandwidth equal to or narrower than a threshold), as in HARQ operation rule example 2 illustrated in FIG. 15.

Meanwhile, in the high-quality environment where a broader bandwidth is possibly configured, the coding gain by the IR is greater than the maximal ratio combining gain by the CC, compared to the low-quality environment. Thus, the HARQ type is configured to be the IR in the case of a broader bandwidth (e.g., when the bandwidth is 80 MHz or more) as in HARQ operation rule example 2 illustrated in FIG. 15.

Configuration Example 7

In Configuration Example 7, the HARQ operations or the HARQ types are switched based on a size of RU allocated for STA 200.

FIG. 16 illustrates exemplary associations between the size of RU (the number of tones) allocated for STA 200 and the HARQ operations.

For example, a smaller size of RU is possibly allocated for STA 200 with lower communication quality. Thus, the smaller the size of RU is, the more easily the HARQ operation improves the communication quality and the throughput.

With this regard, in HARQ operation rule example 1 illustrated in FIG. 16, the HARQ operation is configured in a case of a small size of RU (e.g., when the number of tones is 242 tones or less), and no HARQ operation (inactive) is configured in a case of a large size of RU (e.g., when the number of tones is 484 tones or more), for example.

In the environment where a small size of RU is possibly configured, the coding gain by the IR and the maximal ratio combining gain by the CC are possibly equivalent. Additionally, among the HARQ types, the control information amount of the CC is less than the control information amount of the IR. Thus, it is possible to reduce the overhead and improve the throughput by configuring the HARQ type to be the CC in the case of a small size of RU (e.g., when the size of RU is equal to or smaller than a threshold), as in HARQ operation rule example 2 illustrated in FIG. 16.

Meanwhile, in the environment where a larger size of RU is configured, the coding gain by the IR is greater than the maximal ratio combining gain by the CC. Thus, the HARQ type is configured to be the IR in the case of a large size of RU (e.g., when the number of tones is 484 tones or more) as in HARQ operation rule example 2 illustrated in FIG. 16.

Configuration Examples for the associations between the configurations of the communication modes and the HARQ operations have been described, thus far.

Note that the above-mentioned parameters on the communication mode (e.g., types, values, and ranges of the communication mode) and the associations between the parameters on the communication mode and the HARQ operations are merely examples, and not limited thereto. For example, the parameters on the communication mode may be another parameter that varies depending on the communication quality of STA 200.

[Exemplary Operations of AP and STA]

Figure 17:
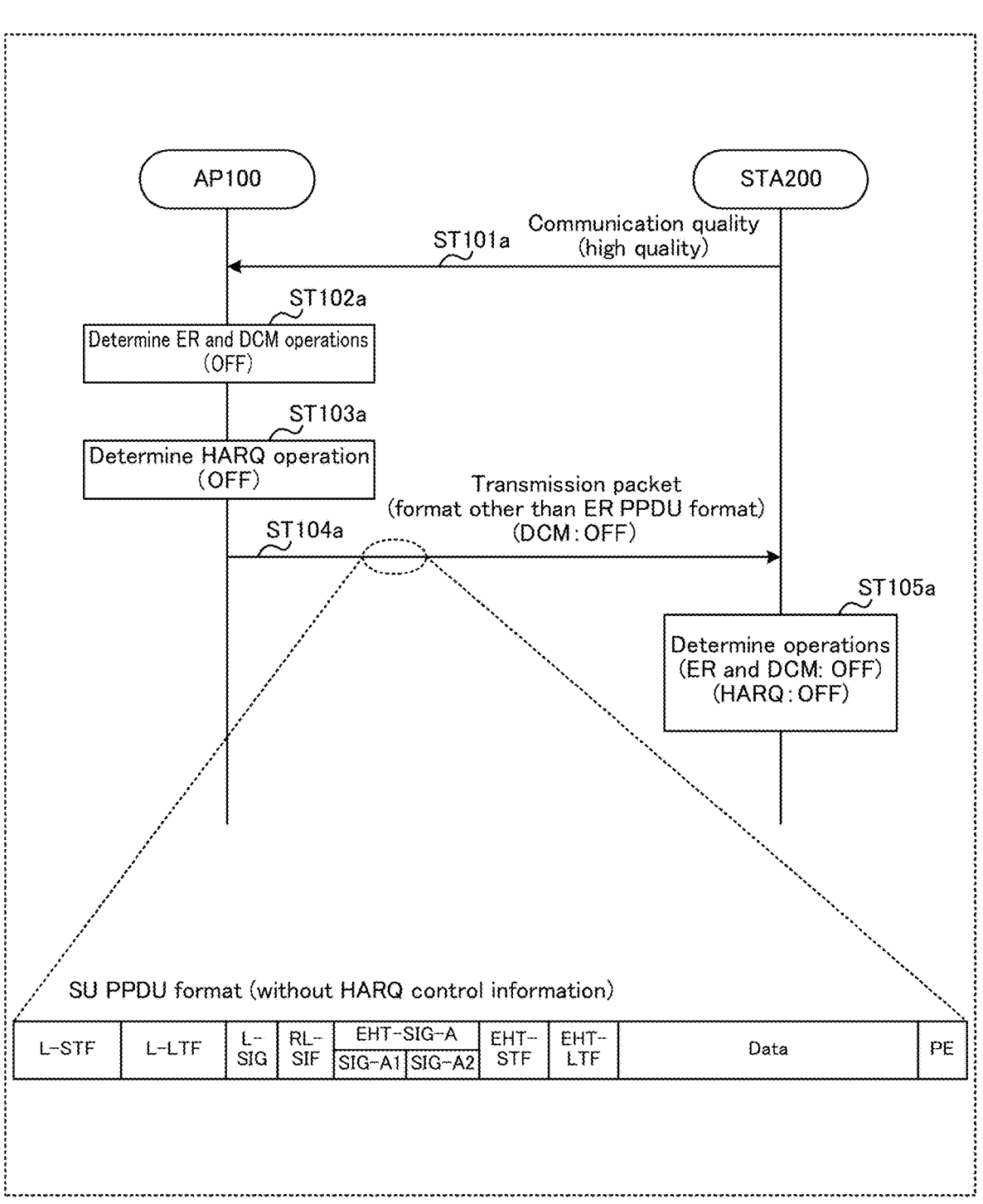
FIG. 17 is a sequence diagram describing an exemplary operation of a radio communication system according to Embodiment 1.

FIG. 17 is a sequence diagram describing an exemplary operation of the radio communication system. Note that FIG. 17 describes the case where STA 200 has high communication quality (e.g., the communication quality equal to or higher than a threshold), by way of example.

In FIG. 17, STA 200 transmits, to AP 100, communication quality information indicating the communication quality (high quality in FIG. 17) of STA 200 (ST101a).

AP 100 determines the communication mode (e.g., configuration of at least one of the Extended Range and the DCM) for STA 200 based on the communication quality of STA 200 (ST102a). For example, the communication quality of STA 200 is high in FIG. 17, and AP 100 thus determines to configure neither the Extended Range nor the DCM (i.e., ER and DCM operations: OFF).

AP 100 also determines the HARQ operation (i.e., performs operation determination) based on the determination result of the communication mode (e.g., the configuration of the communication mode) for STA 200 (ST103a). For example, since it is determined that the Extended Range and the DCM, each of which is one of the communication modes, are not configured in FIG. 17, AP 100 determines not to configure the HARQ operation (i.e., HARQ operation: OFF) (see, for example, FIG. 10, FIG. 11, or FIG. 12).

Note that the state where no HARQ operation is configured indicates, for example, a state where a transmission packet is transmitted and received in a PPDU format that does not include HARQ control information or in a PPDU format that includes information explicitly indicating that no HARQ operation is configured.

In addition, the HARQ control information may include: information indicating either initial transmission or retransmission; information indicating the HARQ type (e.g., CC or IR); information indicating a Redundancy Version (RV); a HARQ process number; or an NDI, for example.

In FIG. 17, AP 100 transmits a transmission packet to STA 200 based on, for example, a PPDU format other than the ER PPDU format (ST104a). For example, the transmission packet in the PPDU format other than the ER PPDU format may include DCM configuration information indicating that the DCM is OFF. Further, the transmission packet in the PPDU format other than the ER PPDU format does not include the HARQ control information, for example.

FIG. 17 illustrates the Single User (SU) PPDU format as an example of the PPDU format other than the ER PPDU format. EHT-SIG-A in the SU PPDU format may be configured with SIG-A1 and SIG-A2 included, for example.

SIG-A1 and SIG-A2 are configured including fields including parameters on the MCS, the DCM, the bandwidth, the number of space time streams (NSTS) and Midamble periodicity, and the STBC, for example, as illustrated in FIG. 18.

As illustrated in FIG. 18, in the PPDU format other than the ER PPDU format, the bits assigned to the respective fields of the PPDU format are used in a case where the DCM is inactive (in a case of "DCM field: 0 setting" illustrated in FIG. 18). In other words, there are no unused bits in each field of the PPDU format other than the ER PPDU format in the case where the DCM is inactive.

Note that, although the description provided here is regarding the case where neither the Extended Range nor the DCM is configured (neither is active), the present disclosure is not limited to this. For example, each of the configurations of the Extended Range and the DCM may be determined independently or in conjunction with each other, based on the communication quality. Further, FIG. 17 describes the case where the HARQ operation is determined based on the configurations of the Extended Range and the DCM, but the present disclosure is not limited to the case. AP 100 may determine the HARQ operation based on the parameters (e.g., MCS, the number of STSs, bandwidth, or RU allocation) on the communication quality (see, for example, any of FIGS. 13 to 16).

In FIG. 17, STA 200 determines the communication mode and the HARQ operation based on, for example, a type of the PPDU format (e.g., constellation of SIG-A2) of the transmission packet transmitted from AP 100 or the DCM configuration information included in the transmission packet (ST105a). For example, STA 200 determines the Extended Range and the DCM to be inactive in FIG. 17. In addition, STA 200 determines, for example, the HARQ operation to be OFF based on the Extended Range and the DCM being inactive in FIG. 17.

AP 100 and STA 200 perform communication (not illustrated) according to the operations determined for the communication mode (e.g., Extended Range and DCM) and the HARQ operation.

Figure 19:
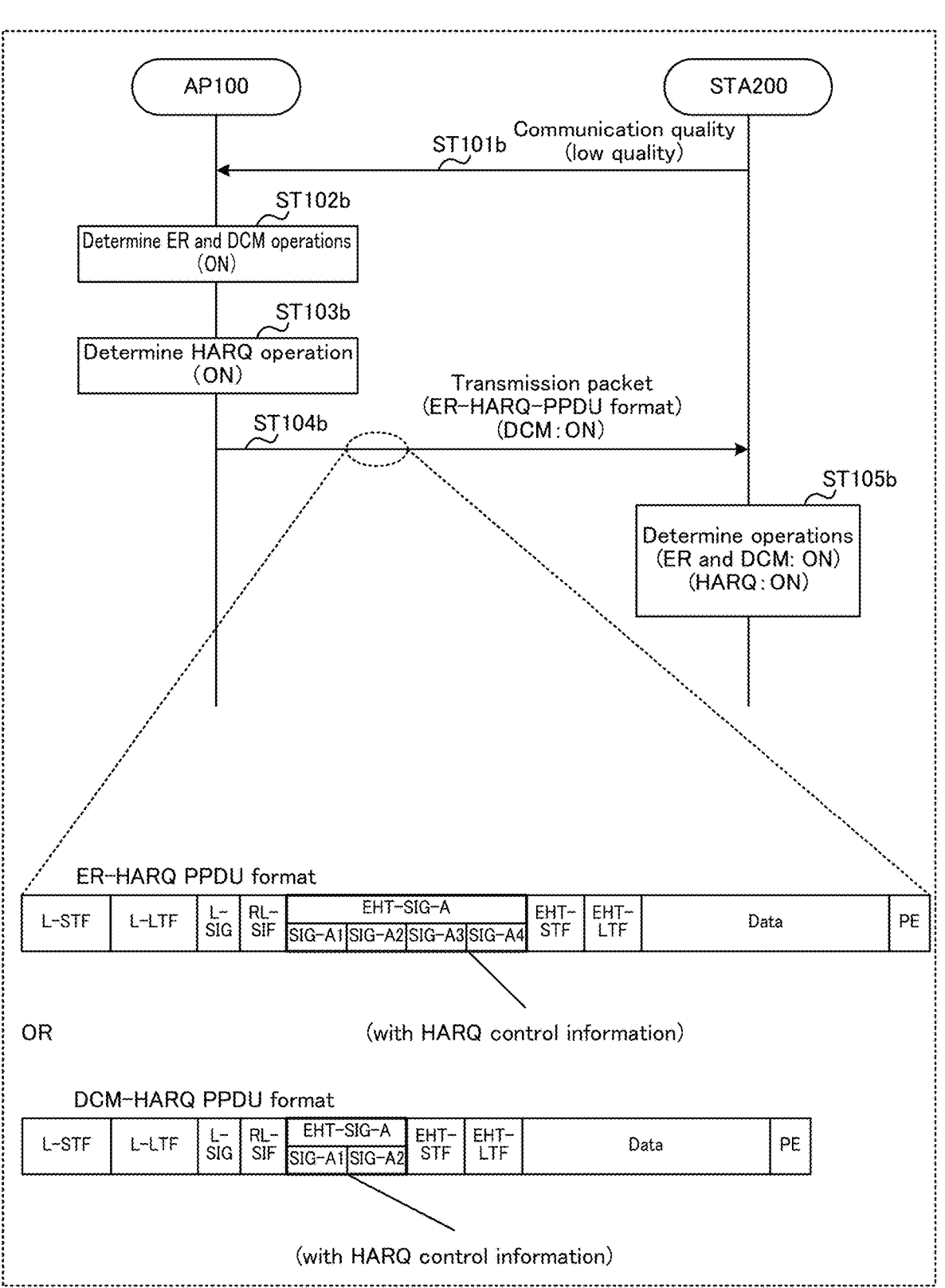
FIG. 19 is a sequence diagram describing another exemplary operation of the radio communication system according to Embodiment 1.

Next, FIG. 19 is a sequence diagram describing another exemplary operation of the radio communication system. Note that FIG. 19 describes the case where STA 200 has low communication quality (e.g., the communication quality lower than a threshold), by way of example.

In FIG. 19, STA 200 transmits, to AP 100, communication quality information indicating the communication quality (low quality in FIG. 19) of STA 200 (ST101b).

AP 100 determines the communication mode (e.g., configuration (ON or OFF) of at least one of the Extended Range and the DCM) for STA 200 based on the communication quality of STA 200 (ST102*b*). For example, the communication quality of STA 200 is low in FIG. 19, and AP 100 thus determines to configure both the Extended Range and the DCM (i.e., ER and DCM operations: ON).

AP 100 also determines the HARQ operation (i.e., performs operation determination) based on the determination result of the communication mode (e.g., the configuration (ON or OFF) of the communication mode) for STA 200 (ST103*b*). For example, since it is determined that the Extended Range and the DCM, each of which is one of the communication modes, are configured in FIG. 19, AP 100 determines to configure the HARQ operation (i.e., HARQ operation: ON) (see, for example, FIG. 10, FIG. 11, or FIG. 12).

Note that the state where the HARQ operation is configured indicates, for example, a state where a transmission packet is transmitted and received in a PPDU format that includes HARQ control information or in a PPDU format that includes information explicitly indicating that the HARQ operation is configured.

In addition, the HARQ operation is not limited to being associated with the configurations of both the Extended Range and the DCM, and may be associated with, for example, the configuration of either the Extended Range or the DCM, or may be associated with another parameter on the communication quality.

In FIG. 19, AP 100 transmits a transmission packet to STA 200 based on, for example, the ER PPDU format (e.g. also referred to as the ER-HARQ PPDU format) (ST104*b*). For example, the transmission packet in the ER PPDU format may include DCM configuration information indicating that the DCM is ON. The transmission packet in the ER PPDU format also includes HARQ control information, for example.

FIG. 19 illustrates the Extended Range operation and the ER-HARQ PPDU format as an example of a PPDU format including the HARQ control information. EHT-SIG-A in the ER-HARQ PPDU format may be configured with SIG-A1, SIG-A2, SIG-A3 and SIG-A4 included, for example. For example, SIG-A2 is a repetition of SIG-A1 and SIG-A4 is a repetition of SIG-A3.

SIG-A1 (or SIG-A2) and SIG-A3 (or SIG-A4) are configured including fields including parameters on the MCS, the bandwidth, and the number of STSs (NSTS) and Midamble periodicity, for example, as illustrated in FIG. 20.

As illustrated in FIG. 20, the MCS is configured to be any of MCS 0, 1, and 2, the bandwidth is configured to be 242 tones or 106 tones, and the number of STSs is configured to be 1, during the Extended Range operation. Thus, some of the bits assigned to the fields of the parameters (e.g., MCS, bandwidth or NSTS and Midamble periodicity) are used during the Extended Range operation in FIG. 20. In other words, there are unused bits in each field of the ER PPDU format during the Extended Range operation.

With this regard, HARQ related signaling (e.g., HARQ control information), for example, may be defined in some or all of the unused bits in each field of the ER PPDU format during the Extended Range operation, in the present embodiment.

As illustrated in FIG. 20 for example, in a case where B19 of the bandwidth field is 0 during the Extended Range operation (i.e., in a case where 242-tone RU is allocated), the MCS may be defined in 2 bits of B3 and B4 among the 4 bits of B3 to B6 in the MCS field, and the HARQ related signaling may be defined in 2 bits of the remaining B5 and B6. Also, as illustrated in FIG. 20 for example, in a case where B19 of the bandwidth field is 1 during the Extended Range operation (i.e., in a case where upper frequency 106-tone RU is allocated), the MCS may be defined in 1 bit of B3 among the 4 bits of B3 to B6 in the MCS field, and the HARQ related signaling may be defined in 3 bits of the remaining B4 to B6.

In addition, the bandwidth (242 tones or 106 tones) may be defined in 1 bit of B19 among the 2 bits of B19 and B20 in the bandwidth field, and the HARQ related signaling may be defined in 1 bit of the remaining B20 during the Extended Range operation, for example, as illustrated in FIG. 20.

Further, in the NSTS and Midamble periodicity field, in a case where the Doppler field is 0 during the Extended Range operation, the number of STSs may be defined in 1 bit of B23 among the 3 bits of B23 to B25, and the HARQ related signaling may be defined in 2 bits of the remaining B24 and B25, for example, as illustrated in FIG. 20. Additionally, in the NSTS and Midamble periodicity field, in a case where the Doppler field is 1 during the Extended Range operation, the number of STSs may be defined in 1 bit of B23 among the 3 bits of B23 to B25, the Midamble periodicity is defined in 1 bit of B25, and the HARQ related signaling may be defined in 1 bit of the remaining B24, for example, as illustrated in FIG. 20.

Note that, in FIG. 19, a PPDU format (e.g., DCM-HARQ PPDU format) that indicates the DCM operation and includes the HARQ control information, for example, may be applied instead of the ER-HARQ PPDU format. As illustrated in FIG. 19 for example, EHT-SIG-A in the DCM-HARQ PPDU format is configured with SIG-A1 and SIG-A2 included, for example.

SIG-A1 and SIG-A2 are configured including fields including parameters on the MCS, the DCM, the bandwidth, the NSTS and Midamble periodicity, and the STBC, for example, as illustrated in FIG. 21.

The MCS is configured to be any of MCS 0, 1, 3, and 4, and the number of STSs is configured to be 1 or 2 during the DCM operation as illustrated in FIG. 21. The combination of the DCM and STBC are not applied during the DCM operation. Thus, some of the bits assigned to the fields of the parameters (e.g., MCS, NSTS and Midamble periodicity, and STBC) are used during the DCM operation in FIG. 21. In other words, there are unused bits in each field of the PPDU format during the Extended Range operation.

With this regard, HARQ related signaling (e.g., HARQ control information), for example, may be defined in some or all of the unused bits in each field of the PPDU format during the DCM operation, in the present embodiment.

For example, the MCS may be defined in 3 bits of B3 to B5 among the 4 bits of B3 to B6 in the MCS field, and the HARQ related signaling may be defined in 1 bit of the remaining B6 during the DCM operation, as illustrated in FIG. 21.

In the NSTS and Midamble periodicity field, for example, the number of STSs may be defined in 1 bit of B23 among the 3 bits of B23 to B25, and the HARQ related signaling may be defined in 2 bits of the remaining B24 and B25 during the DCM operation, as illustrated in FIG. 21.

Further, in the STBC field, the HARQ related signaling may be defined, during the DCM operation, in 1 bit of B9, which is not used during the DCM operation, for example, as illustrated in FIG. 21.

In FIG. 19, STA 200 determines the communication mode and the HARQ operation based on, for example, a type of the PPDU format (e.g., constellation of SIG-A2) of the transmission packet transmitted from AP 100 or the DCM configuration information included in the transmission packet (ST105*b*). STA 200, for example, determines the operations (ON) of the Extended Range and the DCM in FIG. 19. In addition, STA 200 determines the HARQ operation to be ON based on the operations (ON) of the Extended Range and the DCM in FIG. 19, for example.

AP 100 and STA 200 perform communication (not illustrated) according to the operations determined for the communication mode (e.g., Extended Range and DCM) and the HARQ operation.

Exemplary operations of AP 100 and STA 200 have been described, thus far.

Note that FIGS. 17 and 19 describe a case of associating the configurations of both the Extended Range and the DCM and the HARQ operation, but the present disclosure is not limited to this, and the configuration of either the Extended Range or the DCM and the HARQ operation may be associated.

Additionally, FIGS. 17 and 19 describe a case of determining ON or OFF of the HARQ operation based on the communication mode (i.e., communication quality). The HARQ operation determination, however, is not limited to determining the HARQ to be active or inactive, and the HARQ type (e.g., CC or IR), for example, may be determined.

As described above, AP 100 determines the HARQ operation based on the communication mode (i.e., communication parameter) configured according to the communication quality of STA 200 according to the present embodiment. For example, AP 100 determines at least one of the HARQ operation and the HARQ type (e.g., CC or IR) based on the configuration of the communication mode (e.g., at least one of Extended Range and DCM). In addition, STA 200 performs the HARQ operation determined based on the communication mode of STA 200, for example.

This allows STA 200 to perform the HARQ operation according to the communication quality of STA 200, thereby improving the throughput. Thus, the present embodiment makes it possible to improve HARQ control efficiency according to the communication quality.

Further, the HARQ control information is defined in a bit that is not used during the operation of the Extended Range or the DCM (i.e., when the communication mode is configured), for example, in the present embodiment. This enables the signaling related to HARQ control while preventing an increase of signaling from AP 100 to STA 200.

The present embodiment has provided a description of a case where the communication quality is classified into two types, which are high quality and low quality, but the communication quality may be classified into three or more types. For example, the HARQ operation (e.g., active or inactive, or HARQ type) may be associated with three or more types of the communication quality.

As illustrated in FIG. 2, during the Extended Range operation, STA 200 can identify whether it is a PPDU format of the Extended Range (e.g., ER SU PPDU) before decoding SIG-A, for example, by applying a QBPSK signal, which is obtained by phase-rotating a BPSK signal by 90 degrees, in the constellation of SIG-A2. The QBPSK signal may be further applied in at least one of the constellations of SIG-A3 and SIG-A4 in the present embodiment. This allows AP 100 to implicitly indicate, for example, the HARQ control information to STA 200.

Figure 22:
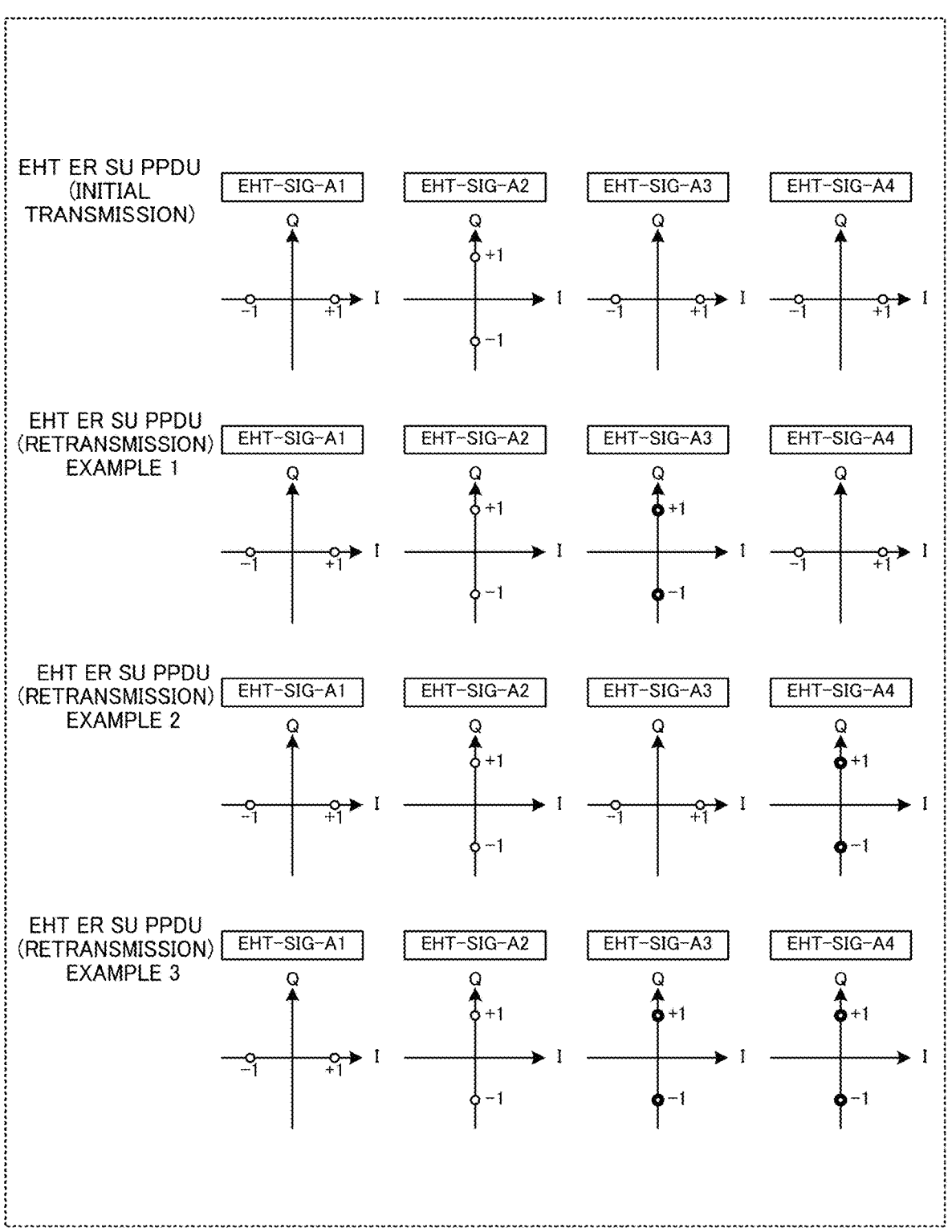
FIG. 22 illustrates exemplary configurations of constellations of the SIG-A according to Embodiment 1.

As illustrated in FIG. 22, for example, there are three patterns of combinations where the QBPSK is applied to at least one of the constellations of SIG-A3 and SIG-A4. AP

100 may thus configure, for example, different constellations of SIG-A3 and SIG-A4 to be indicated to STA 200 between initial transmission and retransmission. From such an operation, STA 200 may identify the initial transmission and the retransmission of HARQ based on the presence or absence of the QBPSK in the constellations of SIG-A3 and SIG-A4.

Further, the combination of the constellations in a plurality of areas (e.g., SIG-A3 and SIG-A4 fields) to which information to be indicated to STA 200 is assigned may be associated with, for example, the HARQ control information (e.g., HARQ type (CC or IR), RV, HARQ process number, or NDI). STA 200 may identify, for example, the HARQ type (CC or IR), the RV, the HARQ process number, or the NDI based on a combination of the QBPSK in the constellations of SIG-A3 and SIG-A4 (any of Examples 1 to 3 illustrated in FIG. 22), for example.

Associating the constellations of SIG-A with the HARQ control information as illustrated in FIG. 22 reduces signaling for indicating the HARQ control information.

In the process of ST104*a* in FIG. 17 and the process of ST104*b* in FIG. 19, the number of bits available for the HARQ related signaling (or HARQ control information) is different between the Extended Range operation and the DCM operation (see, for example, FIG. 20 and FIG. 21). Thus, the content of the HARQ related signaling (e.g., the pattern of RV and the number of HARQ processes) may be different between the Extended Range operation and the DCM operation, for example.

Further, the communication mode, which is a reference for determining the HARQ operation, is not limited to the Extended Range and the DCM, and may be a communication mode indicating whether the MCS, the number of STSs, the bandwidth, or the STBC is limited, for example.

Furthermore, FIGS. 17 and 19 describe the configuration of HE-SIG-A defined in the IEEE 802.11ax, by way of example, but the format of the transmission packet is not limited to this configuration, and may be a configuration of other signaling.

Embodiment 2

Embodiment 1 has provided a description of a method of determining the HARQ operation based on the communication mode (i.e., communication parameter). The present embodiment, in contrast, will provide a description of a method of determining the communication mode (or communication parameter) based on the HARQ operation.

A radio communication system according to the present embodiment includes at least one AP 300 and at least one STA 400.

Figure 23:
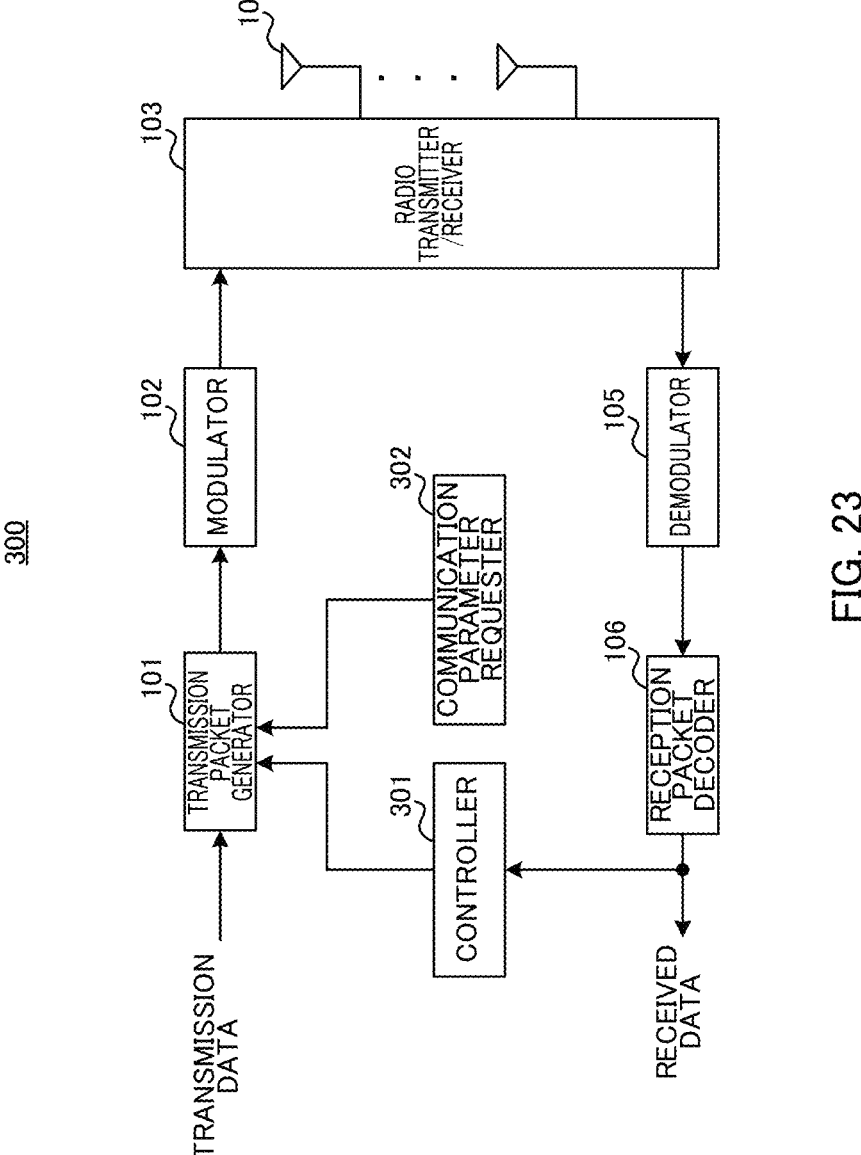
FIG. 23 is a block diagram illustrating an exemplary configuration of an AP according to Embodiment 2.

FIG. 23 is a block diagram illustrating an exemplary configuration of AP 300 according to the present embodiment. Note that, in FIG. 23, the same components as those in Embodiment 1 (FIG. 8) are denoted by the same reference signs, and the descriptions thereof are omitted.

In FIG. 23, controller 301 determines, for example, the HARQ operation (ON or OFF) for STA 400. Controller 301 may determine the HARQ operation based on information on the communication quality of STA 400 inputted from reception packet decoder 106, for example. Controller 301 outputs information on the HARQ operation (e.g., ON or OFF) to transmission packet generator 101.

Accordingly, the information indicating the HARQ operation is indicated from AP 300 to STA 400. Note that the information of the determination on the HARQ operation may be transmitted and received between AP 300 and STA 400 using a MAC frame, for example.

Controller 301 also determines the communication mode for STA 400 (e.g., at least one of Extended Range and DCM) based on the HARQ operation. Note that exemplary methods of determining the communication mode based on the HARQ operation will be described later.

Further, controller 301 determines a communication parameter to be configured for STA 400, for example, based on information, inputted from reception packet decoder 106, on the communication parameter (or also referred to as a recommended communication parameter) fed back from STA 400. Controller 301 outputs the determined communication parameter to transmission packet generator 101. This allows transmission packet generator 101 to generate a transmission packet based on the determined communication parameter.

Communication parameter requester 302 generates a message for requesting a communication parameter to STA 400. Communication parameter requester 302 outputs the generated communication parameter request message to transmission packet generator 101.

Accordingly, the communication parameter request message is indicated from AP 300 to STA 400. Note that the communication parameter may include, for example, the MCS, the number of STSs (e.g., NSTS), the bandwidth, or the STBC operation.

Figure 24:
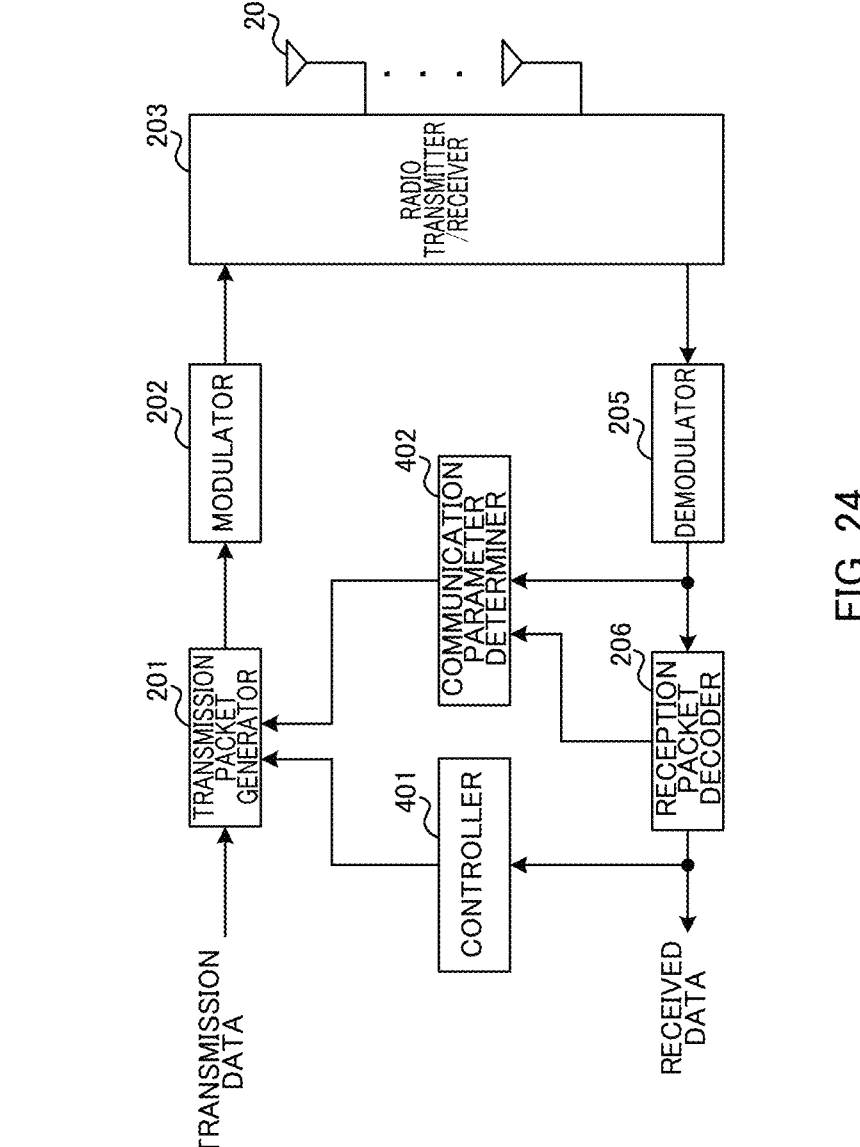
FIG. 24 is a block diagram illustrating an exemplary configuration of an STA according to Embodiment 2.

FIG. 24 is a block diagram illustrating an exemplary configuration of STA 400 according to the present embodiment. Note that, in FIG. 24, the same components as those in Embodiment 1 (FIG. 9) are denoted by the same reference signs, and the descriptions thereof are omitted.

Controller 401 determines, for example, the HARQ operation (e.g., ON or OFF) for STA 400. Controller 401 may determine the HARQ operation based on signaling from AP 300 inputted from reception packet decoder 206, for example. Controller 401 outputs information on the determined HARQ operation (e.g., ON or OFF) to transmission packet generator 201.

Controller 401 also determines the communication mode for STA 400 (e.g., at least one of Extended Range and DCM) based on the HARQ operation. Note that exemplary methods of determining the communication mode based on the HARQ operation will be described later.

Communication parameter determiner 402 determines a communication parameter (i.e., recommended communication parameter) based on the communication quality between AP 300 and STA 400, for example, when a communication parameter request message is inputted from reception packet decoder 206. Communication parameter determiner 402 outputs the determined recommended communication parameter to transmission packet generator 201.

The communication parameter is fed back from STA 400 to AP 300, accordingly.

Note that communication parameter determiner 402 may measure the communication quality based on the demodulated signal inputted from demodulator 205, for example. The information on the communication quality includes, for example, an SNR, a communication range between AP 300 and STA 400, propagation loss, an interference amount, or an error rate.

[Association Between HARQ Operation and Communication Mode]

Next, associations between the HARQ operation and the communication mode according to the present embodiment will be described.

As an example here, a description will be given of the associations between the communication mode for which at least one of the Extended Range and the DCM is configured and the HARQ operation. AP 300 and STA 400 determine the communication mode for STA 400 based on the association between the communication mode and the HARQ operation, and the HARQ operation (e.g., ON or OFF) configured for STA 400.

Configuration Examples 1 to 3 for the associations between the HARQ operation and the communication mode will be each described below.

Configuration Example 1

FIG. 25 illustrates exemplary associations between the HARQ operation (ON or OFF) and the configuration (e.g., active or inactive) of the Extended Range or the DCM according to Configuration Example 1.

In FIG. 25, the Extended Range and the DCM are configured (Extended Range and DCM: Active) when the HARQ is active (e.g., in the case of ON), and neither the Extended Range nor the DCM is configured (Extended Range and DCM: Inactive) when the HARQ is inactive (e.g., in the case of OFF).

This causes both the Extended Range and the DCM to be active, for example, in a case where STA 400 is in a poor communication environment (e.g., the communication quality is equal to or lower than a threshold) and the HARQ is determined to be active. Thus, the communication quality of STA 400 and the throughput can be improved by the operations of the Extended Range and the DCM in addition to the HARQ operation.

Configuration Example 2

FIG. 26 illustrates exemplary associations between the HARQ operation (ON or OFF) and the configuration (e.g., active or inactive) of the Extended Range or the DCM according to Configuration Example 2.

In FIG. 26, when the HARQ is active (e.g., in the case of ON), the Extended Range is configured (Extended Range: Active) and the DCM is not configured (DCM: Inactive). Meanwhile, when the HARQ is inactive (e.g., in the case of OFF), neither the Extended Range nor the DCM is configured (Extended Range and DCM: Inactive) in FIG. 26.

This causes the Extended Range to be active, for example, in a case where STA 400 is in a poor communication environment (e.g., the communication quality is equal to or lower than a threshold) and the HARQ is determined to be active. Thus, the communication quality of STA 400 and the throughput can be improved by the operation of the Extended Range in addition to the HARQ operation.

Note that Configuration Example 2 may be applied, for example, in a case where the communication quality improvement by the DCM is unnecessary, or in a case where STA 400 does not support the DCM.

Configuration Example 3

FIG. 27 illustrates exemplary associations between the HARQ operation (ON or OFF) and the configuration (e.g., active or inactive) of the Extended Range or the DCM according to Configuration Example 3.

In FIG. 27, when the HARQ is active (e.g., in the case of ON), the DCM is configured (DCM: Active) and the Extended Range is not configured (Extended Range: Inactive). Meanwhile, when the HARQ is inactive (e.g., in the case of OFF), neither the Extended Range nor the DCM is configured (Extended Range and DCM: Inactive) in FIG. 27.

This causes the DCM to be active, for example, in a case where STA 400 is in a poor communication environment (e.g., the communication quality is equal to or lower than a threshold) and the HARQ is determined to be active. Thus, the communication quality of STA 400 and the throughput can be improved by the operation of the DCM in addition to the HARQ operation.

Note that Configuration Example 3 may be applied, for example, in a case where the communication quality improvement by the Extended Range is unnecessary, or in a case where STA 400 does not support the Extended Range.

Configuration Examples 1 to 3 have been described, thus far.

As describe above, the rules of the associations between the HARQ operation and the communication modes, for example, uniquely determine the configuration (active or inactive) of the communication mode, such as the Extended Range and the DCM, in accordance with the HARQ operation (e.g., active or inactive). This reduces signaling for the determination on the communication mode.

Note that FIGS. 25 to 27 illustrate the associations between the HARQ operation and the configurations of the Extended Range and the DCM, but the communication mode (or communication parameter) associated with the HARQ operation is not limited thereto. For example, the HARQ operation may be associated with another communication parameter (e.g., MCS, the number of STSs, bandwidth, and RU allocation).

Further, the content of the HARQ operation is not limited to the HARQ operation, and may be the HARQ type (e.g., either CC or IR). For example, the HARQ type and the communication mode (e.g., Extended Range, DCM, MCS, the number of STSs, bandwidth, and RU allocation) may be associated with each other. For example, at least one of the Extended Range and the DCM may be configured to be active when the HARQ type is CC, and neither the Extended Range nor the DCM may be configured to be active when the HARQ type is IR.

[Exemplary Operations of AP and STA]

Next, exemplary operations of AP 300 and STA 400 according to the present embodiment will be described.

FIG. 28 is a sequence diagram describing an exemplary operation of the radio communication system.

In FIG. 28, AP 300 and STA 400 determine the HARQ operation (e.g., ON or OFF) (ST201). AP 300 and STA 400 may determine the HARQ operation using signaling in a MAC frame, for example.

For example, AP 300 and STA 400 exchange information about STA 400 (e.g., Capability information) at the time of association (i.e., connection request and response). AP 300 may determine the HARQ operation (ON/OFF) based on the information about STA 400 and the communication quality, for example.

Exemplary methods of determining the HARQ operation include a method based on the number of STAs connected to AP 300. For example, more STAs connected to AP 300 cause more multiplexes in the Orthogonal Frequency Division Multiple Access (OFDMA) or the Multi User-Multiple Input Multiple Output (MU-MIMO). Thus, more STAs connected to AP 300 cause an increase in the amount of signaling transmitted in a single packet when HARQ information for STAs to be multiplexed is indicated collectively. With this regard, AP 300 may determine that the HARQ operation is active when a small number (e.g., less than a threshold) of STAs are connected to AP 300, for example, and may determine that the HARQ operation is inactive when a large number (e.g., equal to or greater than a threshold) of STAs are connected to AP 300. This method prevents the increase in the amount of signaling by determining that the HARQ operation is inactive when a large number of STAs are connected to AP 300.

Another exemplary method of determining the HARQ operation is a method based on the error rate of a reception packet. For example, AP 300 may determine that the HARQ operation is inactive when the reception packet has an error rate less than a threshold, and may determine that the HARQ operation is active when the reception packet has an error rate equal to or greater than the threshold. The lower the error rate of the reception packet is, the less improvement effect on the communication quality the HARQ operation brings, thereby preventing the increase in the amount of signaling by determining that the HARQ operation is inactive.

Note that the method of determining the HARQ operation is not limited to the above methods, and another method may be applied.

In FIG. 28, AP 300 and STA 400 determine the communication mode for STA 400 based on the HARQ operation (ST202 and ST203). For example, AP 300 and STA 400 may determine the configuration of the communication mode based on the associations between the HARQ operation and the configurations of the communication modes (Extended Range and DCM here) illustrated in any of FIGS. 25, 26, and 27, and the determined HARQ operation (ON or OFF).

AP 300 transmits a message for requesting a communication parameter to STA 400 (ST204).

STA 400 feeds back a recommended communication parameter to AP 300 in response to the communication parameter request transmitted from AP 300 (ST205).

AP 300 determines a communication parameter to be configured for communication with STA 400 based on the recommended communication parameter fed back from STA 400, and transmits data to STA 400 based on the determined communication parameter (ST206).

Note that AP 300 may change the definition of the communication parameter based on the HARQ operation (ON or OFF) when determining the communication parameter to be indicated to STA 400.

By way of example here, a description will be given of a case where the communication parameter includes the MCS, the number of STSs, the bandwidth, and the STBC operation. FIG. 29 illustrates exemplary definitions of the communication parameters when no HARQ operation is configured (HARQ operation: OFF), and FIG. 30 illustrates exemplary definitions of the communication parameters when the HARQ operation is configured (HARQ operation: ON).

As illustrated in FIG. 29, each of the bits assigned to the MCS, the number of STSs, the bandwidth, and the STBC is used (or reserved) when no HARQ operation is configured. In other words, there are no unused bits (or non-reserved bits) among the bits assigned to the MCS, the number of STSs, the bandwidth, and the STBC when no HARQ operation is configured.

Meanwhile, in an environment where the communication quality is so poor that the HARQ is active (e.g., environment with communication quality equal to or lower than a threshold), for example, it is possible to fail to secure required communication quality in all of the communication parameter configuration ranges. Thus, when the HARQ operation is active, for example, the communication parameter configured for STA 400 possibly includes some values that can secure the required communication quality in the communication range. In other words, the communication parameter configuration range is possibly partially limited with the HARQ operation.

As illustrated in FIG. 30, for example, the ranges of the parameters configured for the MCS, the number of STSs, the bandwidth, and the STBC are sometimes narrow when the HARQ operation is configured, compared to the case where no HARQ operation is configured. Thus, when the HARQ operation is configured, a reduced number of bits may be assigned to the MCS, the number of STSs, the bandwidth, and the STBC, and HARQ related signaling may be defined in the remaining bits, as illustrated in FIG. 30.

In other words, the parameters defined in the bits to which the information to be indicated to STA 400 is assigned are different between the case where the HARQ operation is configured (see, for example, FIG. 30) and the case where no HARQ operation is configured (see, for example, FIG. 29).

For example, in FIG. 30, the HARQ related signaling is defined in two of the four bits of the MCS, in three of the four bits of the number of STSs (e.g., NSTS-1), in two of the three bits of the bandwidth, and in one bit of the STBC.

Note that the combinations (combinations of definitions) of the communication parameters and the contents of the HARQ related signaling (e.g., transmission type, HARQ type, RV, and HARQ process number) illustrated in FIG. 30 are merely examples, and not limited thereto. In addition, the content of the HARQ related signaling associated with each communication parameter is not limited to the parameters illustrated in FIG. 30.

As described above, AP 300 and STA 400 determine the configuration of the communication mode for STA 400 based on the HARQ operation for STA 400, according to the present embodiment. This allows STA 400 to perform the HARQ operation according to the communication quality of STA 400, thereby improving the throughput. Thus, the present embodiment makes it possible to improve HARQ control efficiency according to the communication quality.

Further, the communication parameter defined in each bit of the signaling indicated from AP 300 to STA 400 is switched based on the HARQ operation, in the present embodiment. At this time, HARQ control information (i.e., HARQ related signaling) is defined in a bit that is not used during the HARQ operation, for example. This enables the signaling related to HARQ control while preventing an increase of signaling from AP 300 to STA 400.

Embodiment 3

For example, there is a Link Adaptation function for adaptively changing a communication parameter, such as the MCS, depending on the communication environment of an STA.

In the link adaptation, an AP transmits a message (e.g., MCS Request (MRQ)) for requesting the MCS (i.e., recommended MCS) to an STA, for example. In response to the MRQ, the STA feeds back a message (e.g., MCS Feedback (MFB)) including the MCS corresponding to the communication quality (e.g., referred to as a recommended MCS) to the AP, for example.

The present embodiment will provide a description of a case where information on HARQ control is included in one of the communication parameters adaptively changed by the link adaptation.

A radio communication system according to the present embodiment includes at least one AP and at least one STA.

FIG. 31 is a sequence diagram describing an exemplary operation (e.g., link adaptation) of the radio communication system.

In FIG. 31, the AP transmits a message for requesting a communication parameter to the STA (ST301). The message for requesting a communication parameter may be, for example, a message (MRQ) for requesting the MCS or another message.

The communication parameter to be requested may be, for example, the MCS or another communication parameter (e.g., the number of STSs, bandwidth, RU allocation, and DCM operation) (see, for example, NPL 2). When both the AP and the STA support the HARQ operation, for example, the communication parameter to be requested may include information on HARQ control.

The STA feeds back a recommended communication parameter to the AP in response to the communication parameter request transmitted from the AP (ST302). The message for feeding back the recommended communication parameter may be, for example, a message (e.g., MFB) for feeding back the recommended MCS or another message. The STA may determine the recommended communication parameter based on the communication quality between the AP and the STA, for example.

When both the AP and the STA support the HARQ operation, for example, the recommended communication parameter may include a parameter on the HARQ operation. The parameter on the HARQ operation may be, for example, the HARQ operation (ON or OFF) or the HARQ type (e.g., CC or IR).

The AP determines a communication parameter (e.g., MCS and HARQ operation) to be configured for the STA based on the recommended communication parameter fed back from the STA (ST303).

The AP then transmits data to the STA based on the determined communication operation (ST304).

As described above, the AP includes the information on the HARQ operation in the communication parameter to be requested to the STA, in the present embodiment. This allows the AP to adaptively change the HARQ operation according to the communication quality of the STA. Thus, the present embodiment allows the AP to perform the HARQ control based on an appropriate communication parameter that corresponds to the communication quality of the STA and is neither excessive nor insufficient.

Additionally, in the present embodiment, the message for requesting the HARQ operation is included in, for example, the message (e.g., MRQ) for requesting the recommended MCS, thereby preventing the increase of signaling.

Note that the present embodiment may be combined with either Embodiment 1 or Embodiment 2. For example, the AP may determine the HARQ operation as in Embodiment 1 based on the HARQ operation indicated in the recommended communication parameter fed back from the STA or another parameter (e.g., DCM operation, MCS, the number of STSs, bandwidth, or RU allocation) as described in the present embodiment. Further, the AP may determine the HARQ operation based on the HARQ operation indicated in the recommended communication parameter fed back from the STA as described in the present embodiment, and may further determine the communication mode (e.g., at least one of Extended Range and DCM) based on the HARQ operation as in Embodiment 2.

In addition, information (e.g., signaling) on the link adaptation may be transmitted and received between the AP and the STA in the MAC layer, for example. In other words, the message for requesting the HARQ operation and the recommended communication parameter indicating the HARQ operation may be included in a signal in the MAC layer (e.g., also referred to as an MPDU or a MAC frame).

Note that the message for requesting the HARQ operation and the recommended communication parameter indicating the HARQ operation may be transmitted and received not only in the MAC layer but also in another layer (e.g., physical layer). Further, some of the information on the link adaptation may be transmitted and received in the MAC layer, and other information may be transmitted and received in the physical layer.

Embodiments of the present disclosure have been described, thus far.

Other Embodiments

Although the descriptions in the above embodiments are based on the format of the IEEE 802.11ax as an example, an embodiment of the present disclosure is not limited to being applied to the format of the 11ax. An embodiment of the present disclosure can be applied to, for example, the IEEE 802.11be (EHT), which is a next generation standard of the IEEE 802.11ax, and the IEEE 802.11bd (Next Generation V2X (NGV)), which is a next generation standard of the 802.11p standard for a vehicular environment.

Additionally, at least two of Embodiments 1, 2, and 3 may be combined and applied.

Further, the above embodiments have provided descriptions of the downlink HARQ operation from the AP to the STA, but the present disclosure may also be applied to uplink from the STA to the AP.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A base station according to an embodiment of the present disclosure includes: control circuitry, which, in operation, determines one of a communication parameter configured according to communication quality and an operation of retransmission control based on the other; and communication circuitry, which, in operation, performs communication with a terminal based on the determined communication parameter or the determined operation of the retransmission control.

In an embodiment of the present disclosure, the control circuitry determines the operation of the retransmission control based on the communication parameter.

In an embodiment of the present disclosure, the communication parameter indicates a configuration of a communication mode, and the control circuitry determines at least one of the operation of the retransmission control and/or a type of the retransmission control based on the configuration of the communication mode.

In an embodiment of the present disclosure, information on the retransmission control is defined in a bit that is not used when the communication mode is configured among a plurality of bits where information to be indicated to the terminal is assigned.

In an embodiment of the present disclosure, in a case where the communication mode is configured, the control circuitry configures different constellations of information to be indicated to the terminal between initial transmission and retransmission.

In an embodiment of the present disclosure, a combination of constellations in a plurality of areas where information to be indicated to the terminal is assigned and information on the retransmission control are associated with each other.

In an embodiment of the present disclosure, the control circuitry determines the communication parameter based on the operation of the retransmission control.

In an embodiment of the present disclosure, the communication parameter indicates a configuration of a communication mode, and the control circuitry determines the configuration of the communication mode based on the operation of the retransmission control.

In an embodiment of the present disclosure, the communication parameter defined in a bit in a case where the operation of the retransmission control is configured is different from the communication parameter defined in the bit in a case where the operation of the retransmission control is not configured, the bit being a bit where information to be indicated to the terminal is assigned.

In an embodiment of the present disclosure, the control circuitry includes information on the retransmission control in the communication parameter to be requested to the terminal.

A terminal according to an embodiment of the present disclosure includes: control circuitry, which, in operation, determines one of a communication parameter configured according to communication quality and an operation of retransmission control based on the other; and communication circuitry, which, in operation, performs communication with a base station based on the determined communication parameter or the determined operation of the retransmission control.

In an embodiment of the present disclosure, the control circuitry includes information on the retransmission control in the communication parameter to be requested to the base station.

A communication method according to an embodiment of the present disclosure includes: determining, by a base station, one of a communication parameter configured according to communication quality and an operation of retransmission control based on the other; and performing communication, by the base station, with a terminal based on the determined communication parameter or the determined operation of the retransmission control.

A communication method according to an embodiment of the present disclosure includes: determining, by a terminal, one of a communication parameter configured according to communication quality and an operation of retransmission control based on the other; and performing communication, by the terminal, with a base station based on the determined communication parameter or the determined operation of the retransmission control.

The disclosure of Japanese Patent Application No. 2019-081799, filed on Apr. 23, 2019, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100, 300 AP
101, 201 Transmission packet generator
102, 202 Modulator
103, 203 Radio transmitter/receiver
104, 204 Antenna
105, 205 Demodulator
106, 206 Reception packet decoder
107 Communication mode determiner
108 HARQ controller
200, 400 STA
207 Communication quality measurer
301, 401 Controller
302 Communication parameter requester
402 Communication parameter determiner

The invention claimed is:

1. An integrated circuit for a base station, the integrated circuit comprising,
   at least one input, which, in operation, inputs an electronic signal; and
   controller circuitry, which, in operation, controls:
   determining, based on operation of retransmission control being on or off, to activate or inactivate a frequency diversity transmission scheme configured to transmit information at different frequencies; and
   performing communication with a terminal with the frequency diversity transmission scheme in case the frequency diversity transmission scheme is determined to be activated, and performing communication with the terminal without the frequency diversity transmission scheme in case the frequency diversity transmission scheme is determined to be inactivated.

2. The integrated circuit according to claim 1, wherein information on the retransmission control is included in a communication parameter to be requested to the terminal.

3. The integrated circuit according to claim 1, wherein the controller circuitry controls determining a communication parameter of the frequency diversity transmission scheme based on the operation of the retransmission control.

4. The integrated circuit according to claim 3, wherein,
   the communication parameter of the frequency diversity transmission scheme indicates a configuration of a communication mode, and
   the controller circuitry controls determining the configuration of the communication mode based on the operation of the retransmission control.

5. The integrated circuit according to claim 3, wherein the communication parameter of the frequency diversity transmission scheme defined in a bit in a case where the operation of the retransmission control is configured is different from the communication parameter defined in the bit in a case where the operation of the retransmission control is not configured, the bit being a bit where information to be indicated to the terminal is assigned.

* * * * *